United States Patent
Guo et al.

(10) Patent No.: US 11,570,006 B2
(45) Date of Patent: Jan. 31, 2023

(54) TRANSACTION DATA PROCESSING METHOD, COMPUTING DEVICE, AND STORAGE MEDIUM

(71) Applicant: TENCENT TECHNOLOGY (SHENZHEN) COMPANY LIMITED, Shenzhen (CN)

(72) Inventors: Rui Guo, Shenzhen (CN); Dongyan Wang, Shenzhen (CN); Maocai Li, Shenzhen (CN); Jun Liang, Shenzhen (CN); Jianjun Zhang, Shenzhen (CN); Zongyou Wang, Shenzhen (CN); Binhua Liu, Shenzhen (CN); Haitao Tu, Shenzhen (CN); Qing Qin, Shenzhen (CN); Bo Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 290 days.

(21) Appl. No.: 16/859,995

(22) Filed: Apr. 27, 2020

(65) Prior Publication Data

US 2020/0259665 A1 Aug. 13, 2020

Related U.S. Application Data

(63) Continuation of application No. PCT/CN2018/111872, filed on Oct. 25, 2018.

(30) Foreign Application Priority Data

Nov. 15, 2017 (CN) .......................... 201711127894.0

(51) Int. Cl.
*H04L 9/32* (2006.01)
*G06F 16/93* (2019.01)
(Continued)

(52) U.S. Cl.
CPC ............ *H04L 9/3247* (2013.01); *G06F 9/466* (2013.01); *G06F 16/93* (2019.01); *H04L 9/0643* (2013.01); *H04L 63/0823* (2013.01); *H04L 9/50* (2022.05)

(58) Field of Classification Search
CPC . H04L 9/3247; H04L 9/0643; H04L 63/0823; H04L 2209/38; G06F 9/466; G06F 16/93
See application file for complete search history.

(56) References Cited

U.S. PATENT DOCUMENTS 7,992,194 B2 * 8/2011 Damodaran .......... H04L 9/3271
380/278
9,635,000 B1 4/2017 Muftic
(Continued)

FOREIGN PATENT DOCUMENTS

CN 1808490 A 7/2006
CN 105631248 A 6/2016
(Continued)

OTHER PUBLICATIONS

The World Intellectual Property Organization (WIPO) International Search Report for PCT/CN2018/111872 dated Jan. 22, 2019 5 Pages (including translation).
(Continued)

*Primary Examiner* — Wasika Nipa
*Assistant Examiner* — Mayasa A. Shaawat
(74) *Attorney, Agent, or Firm* — Anova Law Group PLLC

(57) ABSTRACT

A transaction data processing method includes: receiving a first transaction document from a device of a transaction initiator, the first transaction document being associated with identity labels of a plurality of transaction participants; separately performing identity authentication on the plurality of transaction participants according to the identity labels
(Continued)

of the plurality of transaction participants, to obtain an identity authentication result. The method also includes adding the identity authentication result into the first transaction document when the identity authentication results indicates identity authentication of each of the plurality of transaction participants is successful, to generate a second transaction document carrying the identity authentication result; separately transmitting a signature request for the second transaction document to devices of the plurality of transaction participants; and generating a third transaction document according to responses returned by the devices of the plurality of transaction participants in response to the signature request.

19 Claims, 14 Drawing Sheets

(51) Int. Cl.
*G06F 9/46* (2006.01)
*H04L 9/06* (2006.01)
*H04L 9/40* (2022.01)
*H04L 9/00* (2022.01)

(56) References Cited

U.S. PATENT DOCUMENTS

| | | | | |
|---|---|---|---|---|
| 9,972,011 B2* | 5/2018 | Hey | | G06Q 20/4016 |
| 2002/0029194 A1* | 3/2002 | Lewis | | G06Q 20/10 |
| | | | | 705/40 |
| 2005/0246278 A1* | 11/2005 | Gerber | | G06Q 20/40 |
| | | | | 705/44 |
| 2015/0058931 A1* | 2/2015 | Miu | | G06Q 20/02 |
| | | | | 707/784 |
| 2015/0074776 A1 | 3/2015 | Gonser et al. | | |
| 2015/0150090 A1 | 5/2015 | Carroll et al. | | |
| 2016/0283920 A1 | 9/2016 | Fisher et al. | | |
| 2017/0116403 A1* | 4/2017 | Bouse | | G06F 16/2228 |
| 2017/0177855 A1* | 6/2017 | Costa Faidella | | H04L 63/123 |

FOREIGN PATENT DOCUMENTS

| | | | | |
|---|---|---|---|---|
| CN | 106022681 A | | 10/2016 | |
| CN | 106611372 A | | 5/2017 | |
| CN | 106779385 A | * | 5/2017 | |
| CN | 106779385 A | | 5/2017 | |
| CN | 106790397 A | | 5/2017 | |
| CN | 106845179 A | | 6/2017 | |
| CN | 107222303 A | | 9/2017 | |
| CN | 107968709 A | | 4/2018 | |
| WO | WO-0025246 A1 | * | 5/2000 | G06F 21/64 |
| WO | 2016076904 A1 | | 5/2016 | |

OTHER PUBLICATIONS

The State Intellectual Property Office of the People's Republic of China (SIPO) Office Action 1 for 201711127894.0 dated Jul. 22, 2019 11 Pages (including translation).
China National Intellectual Property Administration (CNIPA) Office Action 1 for 201910666876 dated Sep. 30, 2020 10 Pages (including translation).

* cited by examiner

TRANSACTION DATA PROCESSING METHOD, COMPUTING DEVICE, AND STORAGE MEDIUM

CROSS-REFERENCES TO RELATED APPLICATIONS

This application is a continuation application of PCT Patent Application No. PCT/CN2018/111872, filed on Oct. 25, 2018, which claims priority to Chinese Patent Application No. 201711127894.0, entitled "TRANSACTION DATA PROCESSING METHOD, IDENTITY MANAGEMENT METHOD, AND TRANSACTION AUDIT METHOD", filed with the Chinese Patent Office on Nov. 15, 2017, the entire contents of both of which are incorporated herein by reference.

FIELD OF THE TECHNOLOGY

The present disclosure relates to the field of information technologies, and in particular, to a transaction data processing method, a computing device, and a storage medium.

BACKGROUND OF THE DISCLOSURE

With the development of Internet technologies, there are extensive online transaction services such as an electronic draft transaction in fields such as finances. Herein, a plurality of online transaction services relate to a transaction document (for example, an electronic contract) that needs to be signed by a plurality of parties. Currently, there are potential safety hazards in a signing procedure of the transaction document. For example, an intermediary of bank acceptance bill may have biased behavior, causing related risk. Some criminals also use their false identity and official seals to open interbank accounts in large banks. Without checking the authenticity of interbank accounts strictly, frequent violations of the bill market and continuous security incidents may occur. Other problems of the existing technology related to digital signature on electronic contracts include high technical cost, high bit error rate, and slow transmission speed.

SUMMARY

One aspect of the present disclosure provides a transaction data processing method performed by a transaction processing device. The method includes: receiving a first transaction document from a device of a transaction initiator, the first transaction document being associated with identity labels of a plurality of transaction participants and the identity labels including identity labels for participating institutes and identity labels for participating persons; separately performing identity authentication on the plurality of transaction participants according to the identity labels of the plurality of transaction participants, to obtain an identity authentication result. The identity authentication result including institute authentication results and personnel authentication results. The method also includes adding the identity authentication result into the first transaction document when the identity authentication results indicates identity authentication of each of the plurality of transaction participants is successful, to generate a second transaction document carrying the identity authentication result; separately transmitting a signature request for the second transaction document to devices of the plurality of transaction participants; and generating a third transaction document according to responses returned by the devices of the plurality of transaction participants in response to the signature request. The third transaction document includes the second transaction document and digital signatures respectively generated by respective private keys of the plurality of transaction participants for the second transaction document.

Another aspect of the present disclosure provides a computing device, including a processor and a memory, the memory storing a computer readable instruction that cause the processor to perform: receiving a first transaction document from a device of a transaction initiator, the first transaction document being associated with identity labels of a plurality of transaction participants and the identity labels including identity labels for participating institutes and identity labels for participating persons; separately performing identity authentication on the plurality of transaction participants according to the identity labels of the plurality of transaction participants, to obtain an identity authentication result. The identity authentication result including institute authentication results and personnel authentication results. The processor is also configured to perform: adding the identity authentication result into the first transaction document when the identity authentication results indicates identity authentication of each of the plurality of transaction participants is successful, to generate a second transaction document carrying the identity authentication result; separately transmitting a signature request for the second transaction document to devices of the plurality of transaction participants; and generating a third transaction document according to responses returned by the devices of the plurality of transaction participants in response to the signature request. The third transaction document includes the second transaction document and digital signatures respectively generated by respective private keys of the plurality of transaction participants for the second transaction document.

Another aspect of the present disclosure provides a non-transitory storage medium, storing a computer program, the computer program, when being executed by a computing device, causing the computing device to perform: receiving a first transaction document from a device of a transaction initiator, the first transaction document being associated with identity labels of a plurality of transaction participants and the identity labels including identity labels for participating institutes and identity labels for participating persons; separately performing identity authentication on the plurality of transaction participants according to the identity labels of the plurality of transaction participants, to obtain an identity authentication result. The identity authentication result including institute authentication results and personnel authentication results. The computer program also cause the computing device to perform: adding the identity authentication result into the first transaction document when the identity authentication results indicates identity authentication of each of the plurality of transaction participants is successful, to generate a second transaction document carrying the identity authentication result; separately transmitting a signature request for the second transaction document to devices of the plurality of transaction participants; and generating a third transaction document according to responses returned by the devices of the plurality of transaction participants in response to the signature request. The third transaction document includes the second transaction document and digital signatures respectively generated by respective private keys of the plurality of transaction participants for the second transaction document.

BRIEF DESCRIPTION OF THE DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

The technical solutions in the embodiments of the present disclosure will be clearly and completely described in the following with reference to the accompanying drawings in the embodiments of the present disclosure. It is obvious that the embodiments to be described are only a part, rather than all, of the embodiments of the present disclosure. All other embodiments obtained by a person of ordinary skill in the art based on the embodiments of the present disclosure without creative efforts shall fall within the protection scope of the present disclosure.

Figure 1:
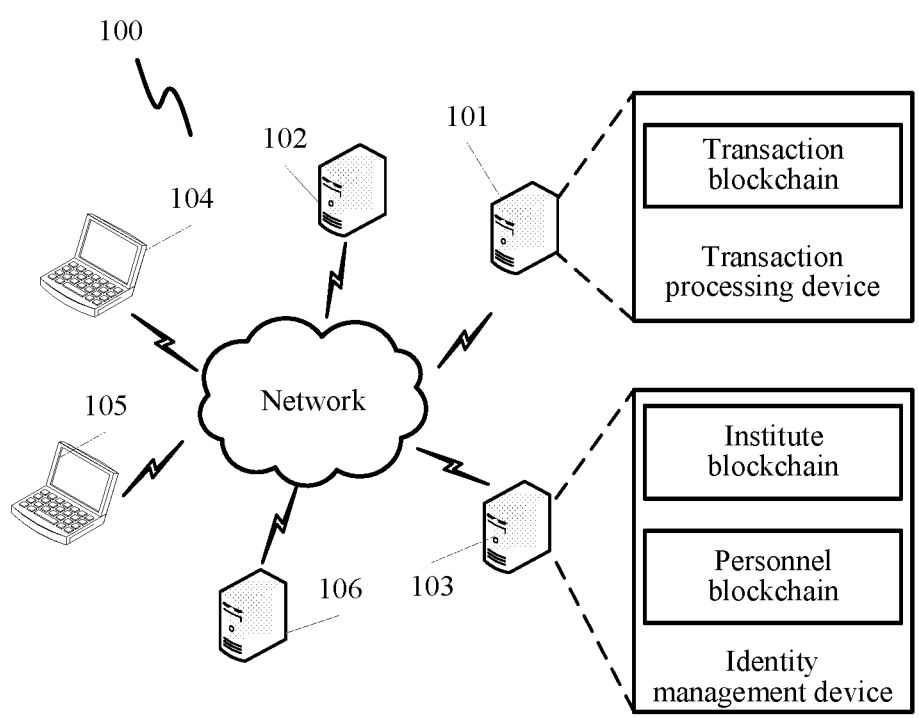
FIG. 1 is a schematic diagram of an application scenario according to some embodiments of the present disclosure.

FIG. 1 is a schematic diagram of an application scenario according to some embodiments of the present disclosure. As shown in FIG. 1, the application scenario 100 includes transaction processing devices 101 and 102, an identity management device 103, devices 104 and 105 of transaction participants, and a transaction audit device 106.

The transaction processing devices 101 and 102 may be applied to fields such as finances, and may manage a processing flow of a transaction document. The transaction document may be, for example, an electronic contract, but is not limited thereto. Taking the electronic contract as an example, the transaction processing devices 101 and 102 may manage a procedure of signing, by transaction participants, the electronic contract. The transaction processing devices 101 and 102 may manage different types of transaction documents. Each type of transaction document may correspond to a transaction processing procedure. In this way, common data (for example, identity information and historical credit information in the following) involved in different transaction processing procedures may be in centralized management, so as to improve relevance between different transaction processing procedures. Herein, the relevance may be, for example, reflected as follows: a credit record of a transaction participant in a transaction may affect historical credit information of processing of another transaction, but the relevance is not limited thereto.

The identity management device 103 may store identity information of a transaction participant, to perform identity authentication on the transaction participant of the electronic contract, so as to ensure that identities of parties signing the contract meet a preset condition. In addition, the identity management device 103 may further communicate with a device of a third-party identity authentication institute, to authenticate the identity of the transaction participant through the device of the third-party identity authentication institute. Herein, the third-party identity authentication institute may be, for example, an administrative institute managing registration information of a natural person or a commercial institute, but is not limited thereto. The preset condition is, for example, that the identity is authenticated or that the identity does not belong to a blacklist. The devices 104 and 105 of the transaction participants may communicate with the transaction processing device 101 or 102, to participate in the processing procedure of the transaction document. For example, the devices 104 and 105 of the transaction participants may participate in the signing procedure of the electronic contract. Herein, the devices 104 and 105 of the transaction participants may be, for example, a device such as a personal computer, a mobile phone, a palmtop digital assistant or a server. This is not limited in the present disclosure. The devices 101, 102, 103 and 106 may each be implemented as a hardware-independent server, a distributed cluster, a cloud computing center, or the like. For example, the devices 101, 102, 103 and 106 may be implemented as a blockchain architecture, to improve data security of the transaction processing procedure and the transaction processing result. In an embodiment, the transaction processing device 101 may include a transaction blockchain. The transaction participants may include a transaction participating institute and transaction participating personnel. For example, the device 104 of the transaction participants may be a device of the transaction participating institute. The device 105 of the transaction participants may be a device of the transaction participating personnel. The identity management device 103 may include an institute blockchain and a personnel blockchain. The institute blockchain may manage identity information of an institute, and the personnel blockchain may manage identity information of personnel. The transaction audit device 106 may audit a transaction processing result (for example, a signed contract) generated by the transaction processing devices 101 and 102. The transaction data processing method of the present disclosure is further described below with reference to FIG. 2.

Figure 2:
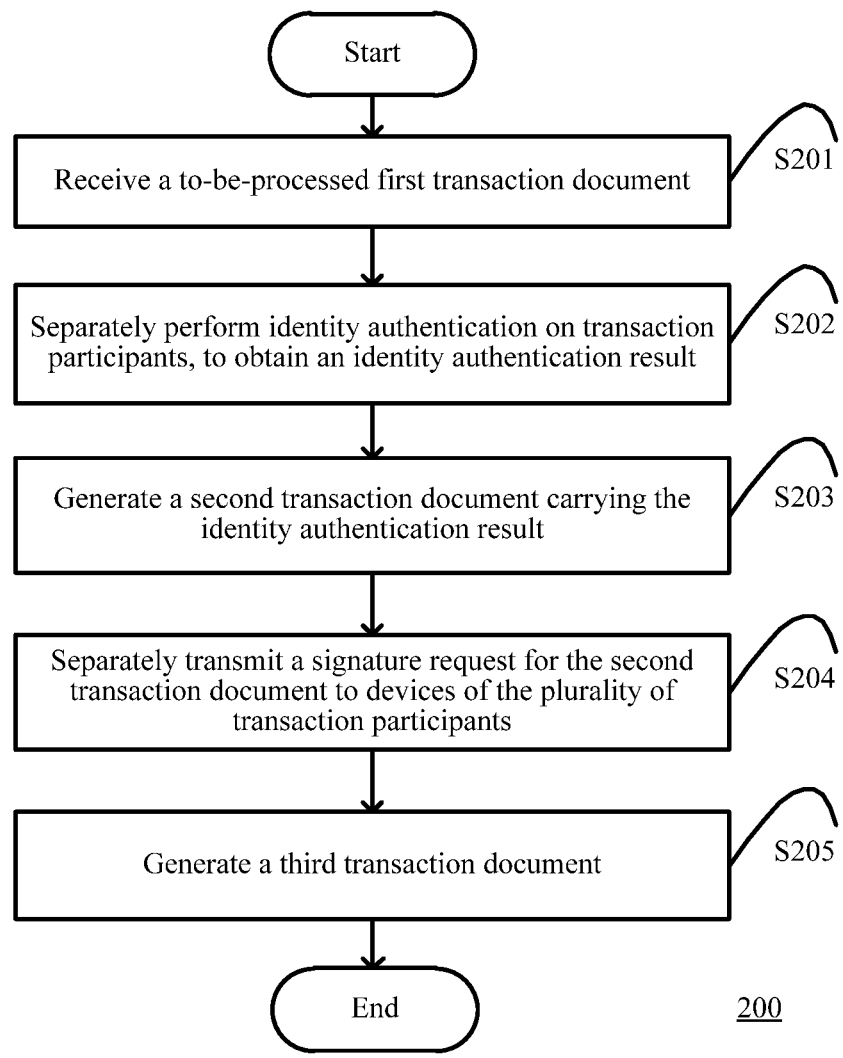
FIG. 2 is a flowchart of a transaction data processing method 200 according to some embodiments of the present disclosure.

FIG. 2 is a flowchart of a transaction data processing method 200 according to some embodiments of the present disclosure.

The transaction data processing method 200 may be performed, for example, by a transaction processing device 102. As shown in FIG. 2, in operation S201, a to-be-processed first transaction document is received from a device of a transaction initiator. The first transaction document is associated with identity labels of a plurality of transaction participants. For example, the first transaction document may include the identity labels of the plurality of transaction participants (for example, a transaction participating institute and transaction participating person). The device of the transaction initiator may be, for example, a device of a transaction participant, but is not limited thereto. The first transaction document is a to-be-processed electronic document. From the perspective of transaction types, the first transaction document is, for example, a to-be-signed electronic contract, but is not limited thereto. Correspondingly, the transaction participant may be a participant of a to-be-signed contract, for example, a signing institute (for example, a bank, a securities firm, or an agent platform participating in an electronic commercial draft transaction) or a signer (for example, a handling person of the electronic contract or a legal representative of a signing institute).

In operation S202, identity authentication is separately performed on the plurality of transaction participants according to the identity labels of the plurality of transaction participants, to obtain a corresponding identity authentication result. Specifically, according to some embodiments of the present disclosure, an instruction of performing identity authentication on the plurality of transaction participants is transmitted to an identity management device (which is, for example, the device 103, but is not limited thereto) in operation S202.

In an embodiment, according to the instruction, the identity management device 103 may query identity information corresponding to the identity labels of the transaction participants in the blockchain, and return the corresponding identity authentication result. In an embodiment, the identity management device 103 may query the identity information corresponding to the identity labels through the device of the third-party identity authentication institute. Correspondingly, the identity authentication result may be received in operation S202. The identity management device 103 may pre-store identity information of participants related to the transaction processing procedure. In a case that the transaction participant is an institute, the identity information is, for example, transaction license information. In a case that the transaction participant is a handling person, the identity information is, for example, identity card information and job information of the handling person. Herein, a manner of performing, by the identity management device 103, identity authentication is, for example, generating an identity authentication result representing that there is corresponding identity information in a case that the identity information corresponding to the identity labels is found through query. More specifically, the identity information may be classified as a whitelist and a blacklist. The identity authentication result received in operation S202 may represent a classification of the identity information. Herein, the whitelist is used for recording identity information of participants allowed to participate in the transaction. The blacklist is used for recording identity information of participants currently forbidden to participate in the transaction. In an embodiment, the identity authentication result may include an address of the corresponding identity information in the identity management device 103. In other words, the identity authentication result may include a proof of existence representing that the identity information is stored in the identity management device 103, or a proof of non-existence representing that the identity information is not stored in the identity management device 103. Taking an institute participant as an example, the identity authentication result may include a block address or a block label of a block storing the identity information in the institute blockchain. In this way, the identity authentication result received in operation S202 may be used for source tracing of the identity information of the transaction participants (details are described in an audit procedure of the transaction document in the following).

In an embodiment, the identity management device may perform classification management on the transaction participants. For example, the identity management device may include an institute blockchain and a personnel blockchain. The institute blockchain may store identity information of a plurality of transaction participating institutes. The personnel blockchain may store identity information of a plurality of transaction participating personnel. Correspondingly, in operation S202, an instruction of performing identity authentication on the participating institutes in the transaction participants is transmitted to the institute blockchain, and an instruction of performing identity authentication on the participating personnel in the transaction participants is transmitted to the personnel blockchain.

In operation S203, whether identity authentication of each of the participants is successful may be determined according to the received identity authentication result of the transaction participants. In operation S203, the identity authentication result may be added into the first transaction document in a case that identity authentication of each of the plurality of transaction participants is successful, to generate a second transaction document carrying the identity authentication result.

In operation S204, a signature request for the second transaction document is separately transmitted to devices of the plurality of transaction participants. In operation S205, a third transaction document is generated according to responses returned by the devices of the plurality of transaction participants in response to the signature request. The third transaction document includes the second transaction document and digital signatures respectively generated by respective private keys of the plurality of transaction participants for the second transaction document.

In some embodiments, in operation S204, the signature request may be separately transmitted to the devices of the transaction participants. The devices of the transaction participants perform a digital signature operation on the second transaction document through private keys according to the signature request, and return the second transaction document including the corresponding digital signatures. In this way, in operation S205, the second transaction document including the digital signatures corresponding to the transaction participants may be received from the devices of the transaction participants, and the third transaction document may be generated. The devices of the transaction participants may perform the digital signature by using various proper private key algorithms (that is, signing the document digitally using a corresponding private key). This is not limited in the present disclosure.

In some embodiments, in operation S204, the signature request may be separately transmitted to the devices of the transaction participants, so that the devices of the transaction participants return corresponding signature authorization messages. In operation S205, the digital signature is performed, through the private keys of the transaction participants, on the second transaction document in response to the received signature authorization messages corresponding to the transaction participants, to generate the third transaction document. In an embodiment, the private keys of the transaction participants may be stored, for example, in a transaction blockchain or another blockchain of the identity management device. Correspondingly, in operation S205, a blockchain storing the private keys may be instructed to complete the corresponding digital signature operation. In another embodiment, the private keys of the transaction participants may be alternatively stored in a storage device that is independent of the transaction processing device 102.

Based on the foregoing, through the disclosed transaction data processing method identities of transaction participants may be verified before a transaction document is processed online, to prevent an institute or a person, which is in an abnormal state (for example, the identities of the transaction participants are not registered or in a blacklist) from participating in a transaction processing flow. Identity authentication during contract signing can be improved. Further, the transaction data processing method may be performed by a blockchain, so that security of the transaction processing procedure and the transaction processing result may be ensured. Further, by adding an identity authentication result into the transaction document (such as a third-party electronic contract), identity information of the transaction participants may be traced back to the transaction document. The signed contract information can be queried online using an electronic seal (e.g., barcode), which can eliminate the occurrence of fake contract incidents, reducing the fraud of bill business.

Figure 3:
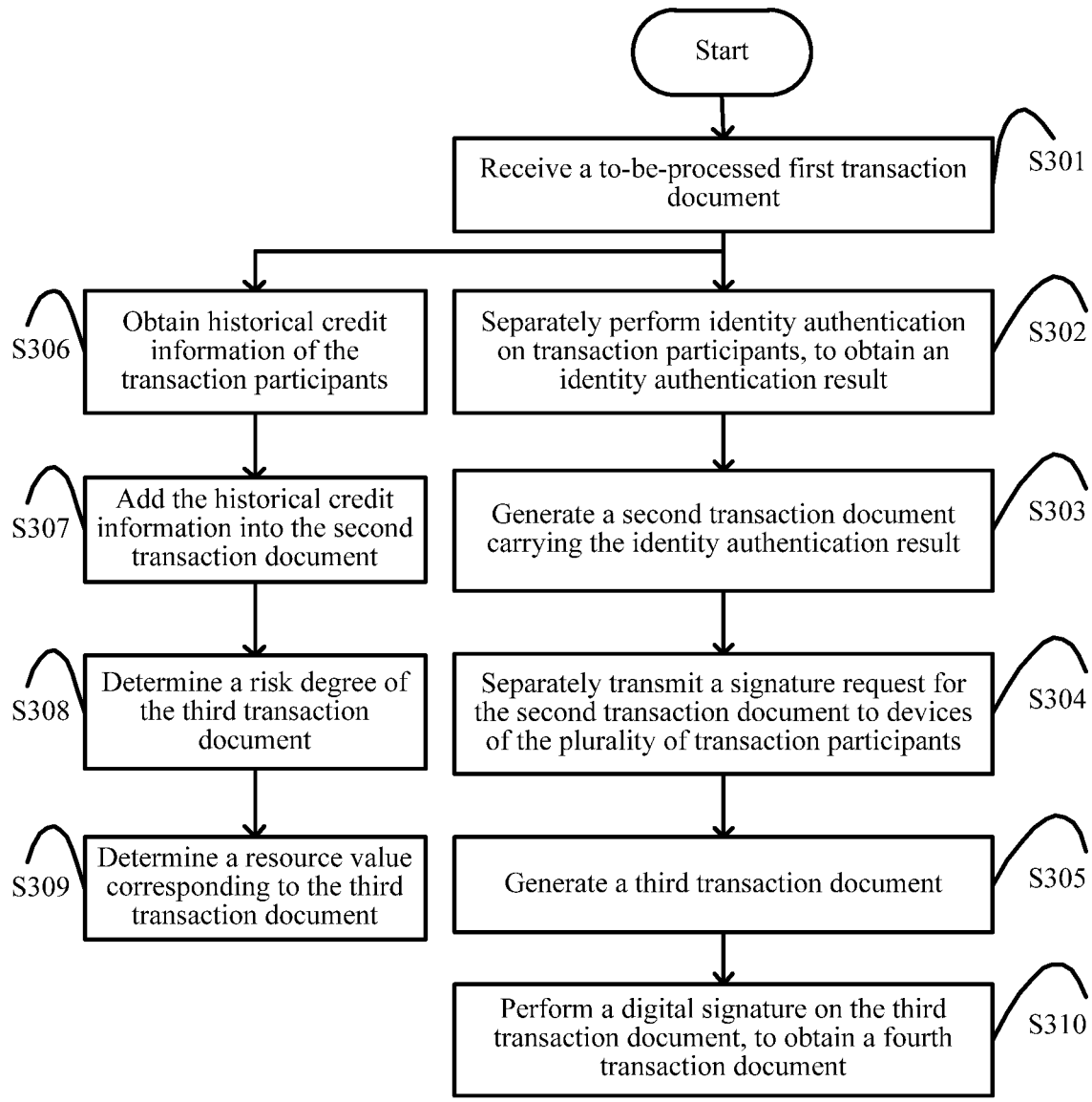
FIG. 3 is a flowchart of a transaction data processing method 300 according to some embodiments of the present disclosure.

FIG. 3 is a flowchart of a transaction data processing method 300 according to some embodiments of the present disclosure.

The transaction data processing method 300 may be performed, for example, by a transaction processing device 102. As shown in FIG. 3, the transaction data processing method 300 includes operations S301 to S305. The implementations of operations S301 to S305 are consistent with those of operations S201 to S205, and will not be repeatedly described herein.

In addition, in a case that the identity management device is instructed to perform identity authentication on the transaction participants in operation S302, operation S306 of obtaining historical credit information corresponding to the identity labels of the transaction participants may be further performed in the method 300. Operation S307 of adding the obtained historical credit information into the second transaction document in a case that identity authentication of each of the plurality of transaction participants is successful may be further performed in a case that operation S303 is performed in the transaction data processing method 300. Herein, in operation S306, the historical credit information may be, for example, obtained from the identity management device.

In some embodiments, in a case of finding, through query, identity information corresponding to an identity label the identity management device may query a historical behavior record of a corresponding transaction participant, to determine corresponding historical credit information. Herein, depending on a type of a specific transaction that is participated in, the historical behavior record may include a record of a transaction document that is participated in by the transaction participant, and a transaction execution record of the transaction document that is participated in. Taking the electronic contract as an example, the historical behavior record may include a record of a signed electronic contract of the transaction participant, an execution record of the signed electronic contract, and the like. Taking a commodity transaction contract as an example, the historical behavior record may include a record of a signed commodity transaction contract of the transaction participant, a performance state of the transaction participant for the commodity transaction contract, an evaluation index of another transaction participant of the contract for the transaction participant, and the like. Herein, the identity management device may use various computing manners used for evaluating the historical credit information. This is not limited in the present disclosure. In an embodiment, the historical behavior record may be, for example, implemented to be stored associatively with the identity information in the identity management device. In another embodiment, the historical behavior record may be alternatively stored independently in a storage device for the identity management device to access. For example, the historical behavior record is stored in a blockchain.

In some embodiments, the identity management device may obtain the historical behavior records of the transaction participants through an offline or online manner, store the historical behavior records associatively with the identity information, and determine the historical credit information through a preset computing manner and based on most recently determined historical behavior records. In this way, the identity management device may directly query corresponding historical credit information in a case of querying identity information corresponding to an identity label. Based on the foregoing, in the method 300, through operation S302, operation S303 and operation S307, the identity information and the historical credit information of the transaction participants are associated in the transaction document.

Based on the obtained historical credit information, operation S308 may be further performed in the method 300. In operation S308, a risk degree of the third transaction document is determined according to the respective historical credit information of the transaction participants. Herein, various computing manners capable of evaluating the risk degree may be used in operation S308. This is not limited in the present disclosure. In operation S309, a resource value that needs to be provided is determined according to the risk degree of the third transaction document. Herein, the resource value may be, for example, a quantity of real currency, a quantity of virtual currency, bonus points, bandwidth resources, or items. The resource value, for example, may correspond to an expense, such as an insurance expense or a taxation expense, of the third transaction document. For example, depending on a specific transaction type of the transaction document, in operation S309, the insurance expense may be determined by using a preset insurance algorithm. For another example, in operation S309, a tax rate corresponding to the third transaction document may be determined according to a mapping relationship between the risk degree and a tax rate, so as to determine a corresponding taxation expense. Herein, the insurance expense or the tax rate determined in operation S309 may be applied to an expense transaction corresponding to the transaction document. For example, the transaction blockchain may execute an expense-related smart contract according to the insurance expense or the taxation expense.

For the third transaction document determined in operation S305, operation S310 of performing the digital signature on the third transaction document through a private key of a target information storage system, to obtain a corresponding fourth transaction document, and storing the fourth transaction document in the target information storage system may be further performed in the method 300. Herein, the target information storage system may be, for example, a device such as the transaction blockchain, another blockchain or a centralized database. This is not limited in the present disclosure.

Figure 4:
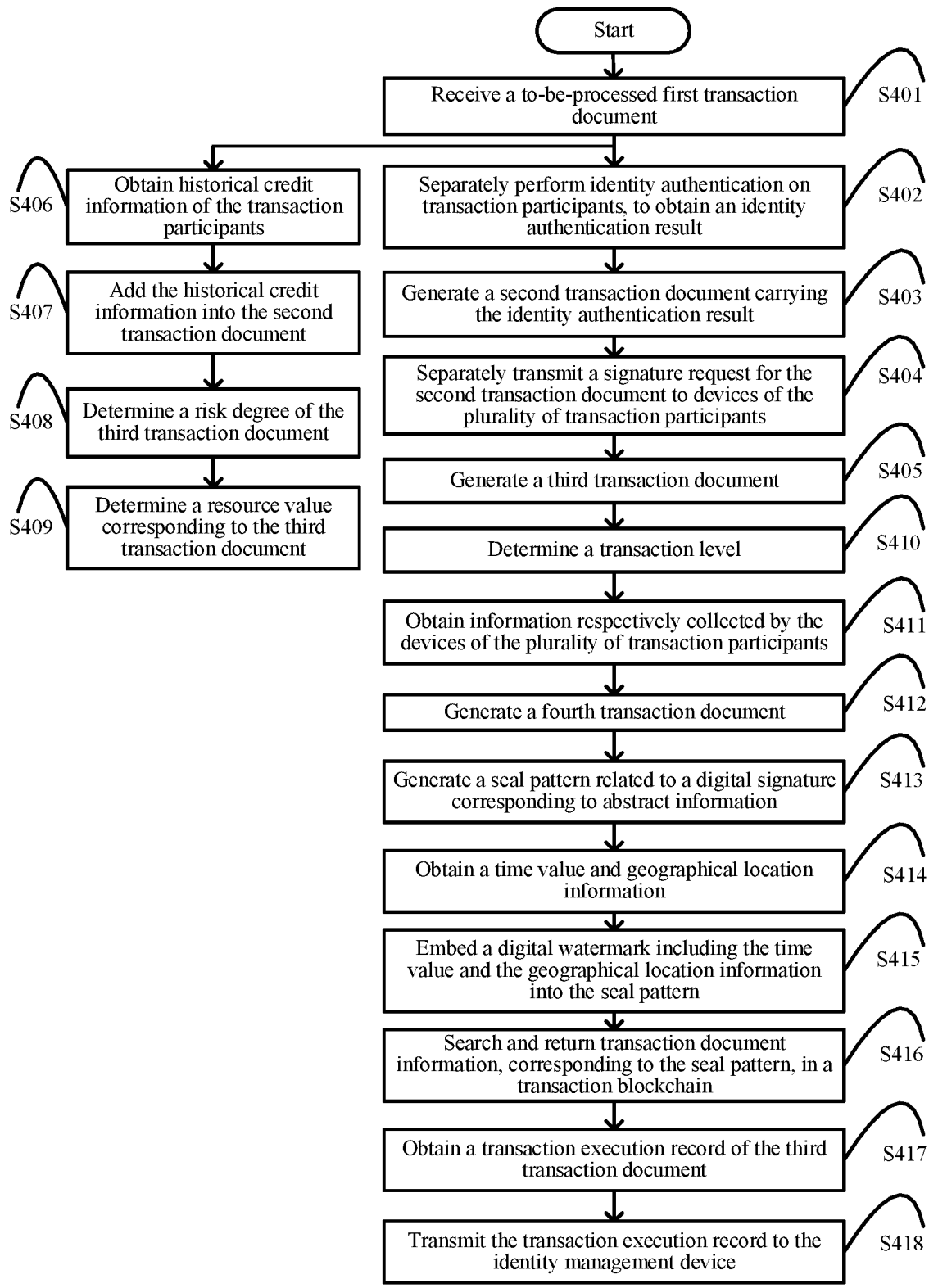
FIG. 4 is a flowchart of a transaction data processing method 400 according to some embodiments of the present disclosure.

FIG. 4 is a flowchart of a transaction data processing method 400 according to some embodiments of the present disclosure. The transaction data processing method 400 may be performed, for example, by a transaction processing device 102. The transaction data processing method 400 includes operations S401 to S409. The implementations of operations S401 to S409 are respectively consistent with those of operations S301 to S309, and will not be repeatedly described herein.

For the third transaction document determined in operation S405, operation S410 may be further performed in the method 400. In operation S410, a transaction level of the third transaction document is determined. The transaction level is used for representing a degree of loss if the third transaction document is not successfully performed (for example, the electronic contract is not performed). The degree of loss may be estimated prior to the transaction to determine the transaction level. The degree of loss may be evaluated according to a monetary value corresponding to the transaction document. Herein, in operation S410, for example, the transaction level may be determined according to a transaction amount or the like involved in the third transaction document, but the present disclosure is not limited thereto.

In a case that the transaction level of the third transaction document is greater than a threshold, operation S411 of obtaining information respectively collected by the devices of the plurality of transaction participants may be performed in the method 400.

In an embodiment, the information collected by the device is monitoring information. The monitoring information collected by the devices of the transaction participants includes video records or image records related to operators of the devices. More specifically, the monitoring information corresponding to the transaction participants includes video records or image records corresponding to the procedure of returning the responses in response to the signature request. Herein, the video records are, for example, monitoring images of the operators of the devices. The image records are, for example, photographs shot for the operators of the devices, but are not limited thereto.

In an embodiment, the information collected by the device is biometric recognition information. The biometric recognition information corresponding to the devices of the transaction participants is used for describing biometric features related to operators of the devices. The biometric recognition information, for example, may include at least one of fingerprint information, voice information and iris information.

Based on the information obtained in operation S411 and the third transaction document determined in operation S405, operation S412 may be further performed in the method 400. In operation S412, abstract information corresponding to the information obtained in operation S411 and the third transaction document is generated, and the digital signature is performed on the abstract information through a private key of a target information storage system, to generate a fourth transaction document. Herein, various algorithms (for example, a hash algorithm) capable of generating the abstract information may be used in operation S412. This is not limited in the present disclosure. Herein, a data format of the digital signature is, for example, a character string corresponding to the abstract information.

In operation S413, a seal pattern related to a digital signature corresponding to the abstract information is generated, and the seal pattern is stored in the transaction blockchain. Herein, in operation S413, the seal pattern may be generated by using various encoding formats. The seal pattern is, for example, in such a format as a two-dimensional barcode or a barcode. In addition, the generated seal pattern may be displayed in the fourth transaction document.

In an embodiment, operation S414 of obtaining, from the devices (for example, 104 and 105) of the plurality of transaction participants, a time value at which the devices respond to the signature request (that is, the devices perform the digital signature or generate the signature authorization messages) and geographical location information of the devices of the plurality of transaction participants may be further included in the method 400. In operation S415, a digital watermark including the time value and the geographical location information is embedded into the seal pattern. Information included in the digital watermark is not limited to the foregoing time value and geographical location information, and other information related to the procedure of generating the third transaction document may be alternatively added or replaced. Herein, various watermark generation algorithms may be used in operation S415. This is not limited in the present disclosure. In another embodiment, the geographical location information and the time value collected in operation S414 may be added to the third transaction document.

In addition, the method 400 may further include operation S416 of searching and returning a transaction document, corresponding to the seal pattern, in a transaction blockchain in response to a query request, related to the seal pattern, received from a transaction audit device 106. Herein, the manner of performing query through the seal pattern may be applied to various scenarios. For example, a transaction document audit institute may obtain corresponding transaction document information from the transaction blockchain through the seal pattern, to audit the transaction document information. The transaction document information includes, for example, a transaction document and execution status information of the transaction document. The audit institute may obtain corresponding identity information from the identity management device 103 according to the identity authentication results of the transaction participants included in the transaction document, and may further query contents such as the historical behavior records of the transaction participants through the identity management device 103. In this way, the transaction audit device 106 of the audit institute may audit the transaction document according to the information found through query.

In addition, the method 400 may further include operation S417 of obtaining a transaction execution record of the third transaction document. Herein, depending on an execution manner of specific transaction contents, in operation S417, the corresponding transaction execution record may be obtained in a proper manner. Taking a commodity transaction contract as an example, the transaction execution record includes a delivery condition of a subject matter, a payment state of a commodity purchaser and mutual evaluation information of both parties for the commodity transaction. In an embodiment, the transaction blockchain includes a smart contract used for executing the third transaction document. The transaction blockchain may record an execution procedure of the smart contract. In this way, in operation S417, the transaction execution record may be obtained from a local device. In another embodiment, in operation S417, the transaction execution record corresponding to the third transaction document may be further obtained from the devices of the participants. In operation S418, the transaction execution record of the third transaction document is transmitted to the identity management device, so that the identity management device 103 associates the identity information of the plurality of transaction participants with the transaction execution record. In addition, the identity management device 103 may update the historical credit information of the transaction participants according to the obtained transaction execution record.

Figure 5:
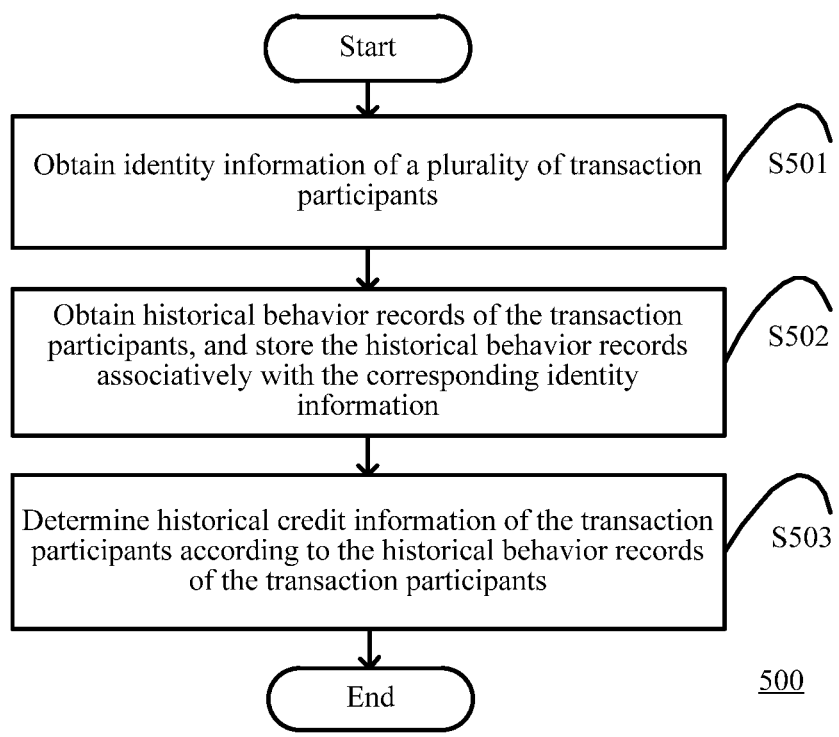
FIG. 5 is a flowchart of an identity management method 500 according to some embodiments of the present disclosure.

FIG. 5 is a flowchart of an identity management method 500 according to some embodiments of the present disclosure. The identity management method 500 may be performed, for example, by an identity management device 103. As shown in FIG. 5, the identity management method 500 includes operation S501 and operation S502. In operation S501, identity information of a plurality of transaction participants is obtained. In an embodiment, the transaction participants may be divided into an institute and personnel. The identity management device 103 may include an institute blockchain and a personnel blockchain. Herein, the institute blockchain is used for storing identity information of the institute. The personnel blockchain is used for storing identity information of the personnel. The identity information of the transaction participants may be stored in corresponding blockchains.

In operation S502, historical behavior records of the transaction participants are obtained, and are stored associatively with the corresponding identity information. The historical behavior record of each transaction participant includes, for example, at least one of a transaction document corresponding to a transaction participated in by the transaction participant and a transaction execution record of the transaction document. Each transaction participant participates in one or more transactions. Different transactions are usually performed in different transaction blockchains. In other words, transactions may be managed by respective corresponding transaction processing devices. There is usually no transaction interaction between the transaction processing devices (that is, there is no data interaction between different transaction processing devices). Herein, in operation S502, historical behavior records of different transactions participated in by the transaction participants may be collected. In operation S503, historical credit information of the transaction participants is determined according to the historical behavior records of the transaction participants. Based on the foregoing, through the method 500, the identity information and the historical behavior records of the transaction participants may be associatively stored in the blockchain, and the identity information may be further associated with the historical credit information, to construct a proof of existence blockchain of the identity information and the historical credit information.

Figure 6:
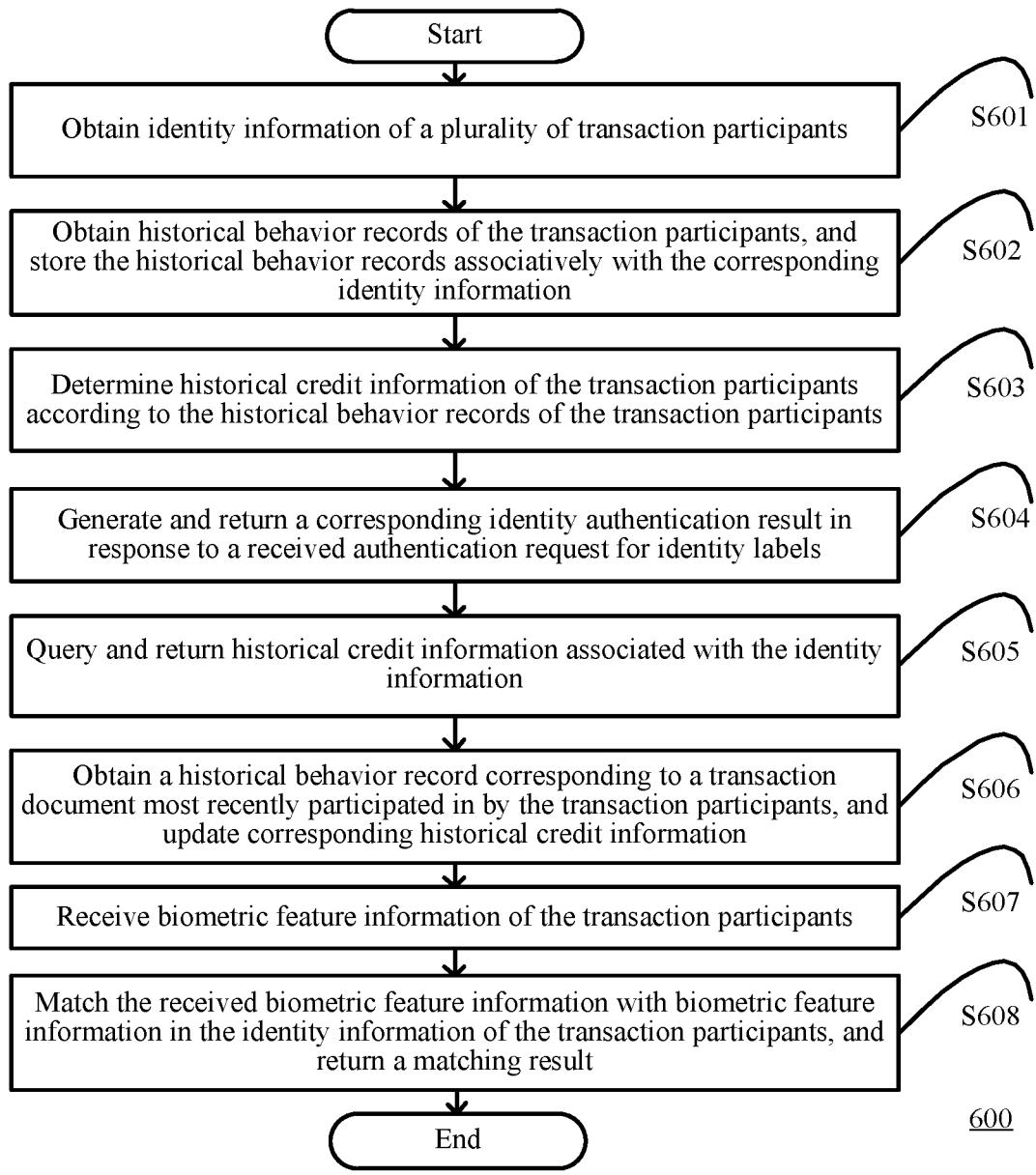
FIG. 6 is a flowchart of an identity management method 600 according to some embodiments of the present disclosure.

FIG. 6 is a flowchart of an identity management method 600 according to some embodiments of the present disclosure. The identity management method 600 may be performed, for example, by an identity management device 103. As shown in FIG. 6, the identity management method 600 may include operations S601 to S603. The implementations of operations S601 to S603 are consistent with those of operations S501 to S503, and will not be repeatedly described herein. In addition, the identity management method 600 further includes operation S604 of receiving an authentication request for the transaction participants, querying identity information corresponding to the transaction participants, and generating and returning a corresponding identity authentication result.

In an embodiment, the identity management method 600 may further include operation S605 of querying and returning historical credit information associated with the identity information. In addition, the identity management method 600 may further include operation S606 of obtaining a historical behavior record corresponding to a transaction document most recently participated in by the transaction participants, and updating corresponding historical credit information. In an embodiment, the identity information corresponding to the transaction participants in the identity management device 103 further includes biometric feature information corresponding to the transaction participants. Herein, the biometric feature information relates to operators of devices of the transaction participants. The operators of the devices are users having management permissions of the devices. The operators are users returning responses in response to the signature request transmitted by the transaction processing device (for example, 101 or 102). The biometric feature information is, for example, facial feature information, fingerprint information, voice information or iris information. The identity management method 600 may further include operation S607 and operation S608. In operation S607, biometric feature information, which is transmitted by a transaction audit device (for example, 106), of one or more transaction participants is received.

In operation S608, the received biometric feature information of the transaction participants is matched with biometric feature information reserved in the identity information of the transaction participants, and a matching result is returned to the transaction audit device 106.

Figure 7:
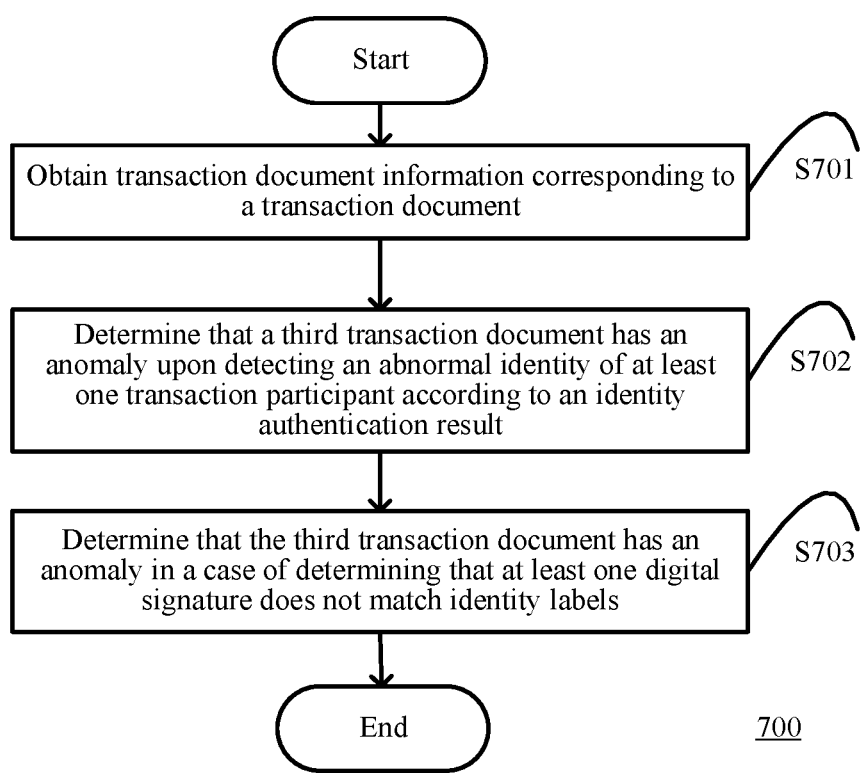
FIG. 7 is a flowchart of a transaction audit method 700 according to some embodiments of the present disclosure.

FIG. 7 is a flowchart of a transaction audit method 700 according to some embodiments of the present disclosure. The transaction audit method 700 may be performed, for example, by the transaction audit device 106.

As shown in FIG. 7, in operation S701, transaction document information corresponding to a third transaction document is obtained. The third transaction document information includes identity labels of transaction participants participating in the third transaction document, an identity authentication result, and digital signatures of the transaction participants. According to an embodiment, in operation S701, according to a seal pattern corresponding to the third transaction document, a request for transaction document information corresponding to the seal pattern is transmitted to a transaction processing device (for example, 101), so that the transaction processing device returns the corresponding transaction document information.

In operation S702, it is determined that the third transaction document has an anomaly upon detecting an abnormal identity of at least one transaction participant according to an identity authentication result according to the identity authentication result. In an embodiment, the identity authentication result of a transaction participant may indicate whether the transaction participant belongs to a whitelist type (that is, a type capable of normally participating in a current transaction), or a blacklist type (that is, a type forbidden to participate in the current transaction or an unregistered type). In a case that the identity of the transaction participant belongs to the blacklist type, in operation S702, the identity of the transaction participant is determined to be abnormal.

In operation S703, the digital signatures of the transaction participants are matched with the identity labels, and it is determined that the third transaction document has an anomaly in a case of determining that at least one digital signature of the digital signatures of the transaction participants does not match the identity labels. Herein, the identity labels are identity information (for example, names of participants in a contract) occurring in the third transaction document.

Based on the foregoing, through the transaction audit method 700, transaction data (for example, a signed contract) may be audited, and whether a transaction document has an anomaly is determined according to transaction document information found through query, to discover an abnormally processed transaction document in time.

Figure 8:
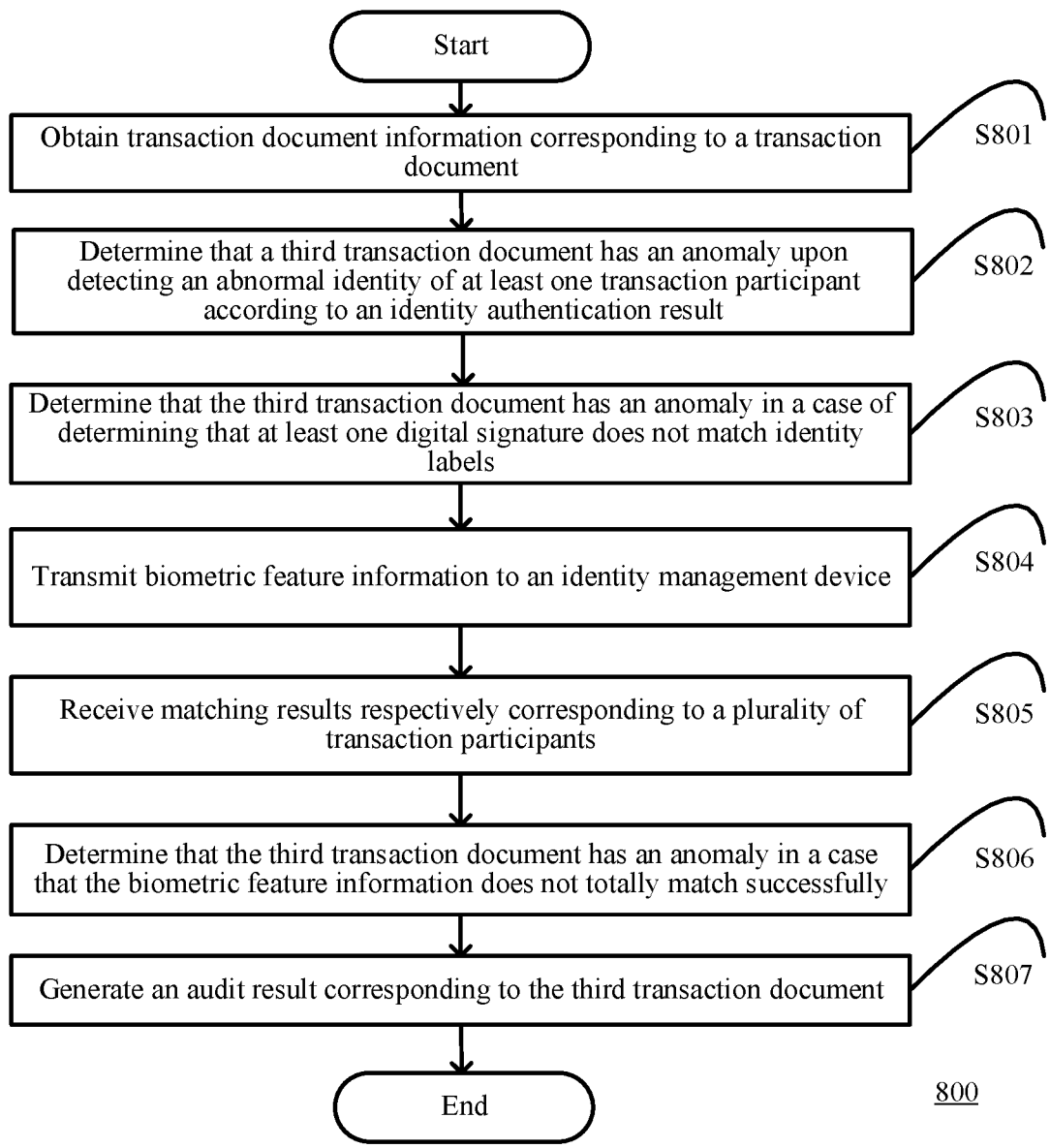
FIG. 8 is a flowchart of a transaction audit method 800 according to some embodiments of the present disclosure.

FIG. 8 is a flowchart of a transaction audit method 800 according to some embodiments of the present disclosure. The transaction audit method 800 may be performed, for example, in the device 106. The transaction audit method 800 includes operations S801 to S803. The implementations of operations S801 to S803 are consistent with those of operations S701 to S703, and will not be repeatedly described herein.

In some embodiments, the transaction audit method 800 may further include operation S804 of transmitting biometric feature information of the plurality of transaction participants to an identity management device (for example, the device 103), so that the identity management device 103 matches the biometric feature information of the transaction participants with locally stored corresponding information, and returns corresponding matching results. In an embodiment, the third transaction document information further includes monitoring information corresponding to the third transaction document. The monitoring information includes video records or image records related to operators of devices of the plurality of transaction participants. In operation S804, for example, facial feature information may be extracted from the monitoring information, and the facial feature information may be transmitted to the identity management device 103 as the biometric feature information. In operation S804, the facial feature information may be obtained by using various feature extraction algorithms, and details are not described herein again. In another embodiment, the third transaction document information includes biometric recognition information. Herein, the biometric recognition information includes fingerprint information, voice information, iris information, or the like. In operation S804, the biometric recognition information may be used as the corresponding biometric feature information.

In operation S805, the matching results of the plurality of transaction participants are received. In operation S806, it is determined that the third transaction document has an anomaly in a case that the biometric feature information of at least one of the plurality of transaction participants does not totally match successfully.

Based on the foregoing, through operations S801 to S806, whether the third transaction document has an anomaly may be determined through the transaction audit method 800. Based on this, operation S807 of generating an audit result corresponding to the third transaction document may be further performed in the transaction audit method 800. The audit result, for example, may include a conclusion indicating whether the transaction document is normal and a record of an audit operation procedure. Details are not described herein again. In some embodiments, an operation performed in the transaction audit method 800 is auditing a smart contract, which relates to the third transaction document, in a blockchain.

Figure 9:
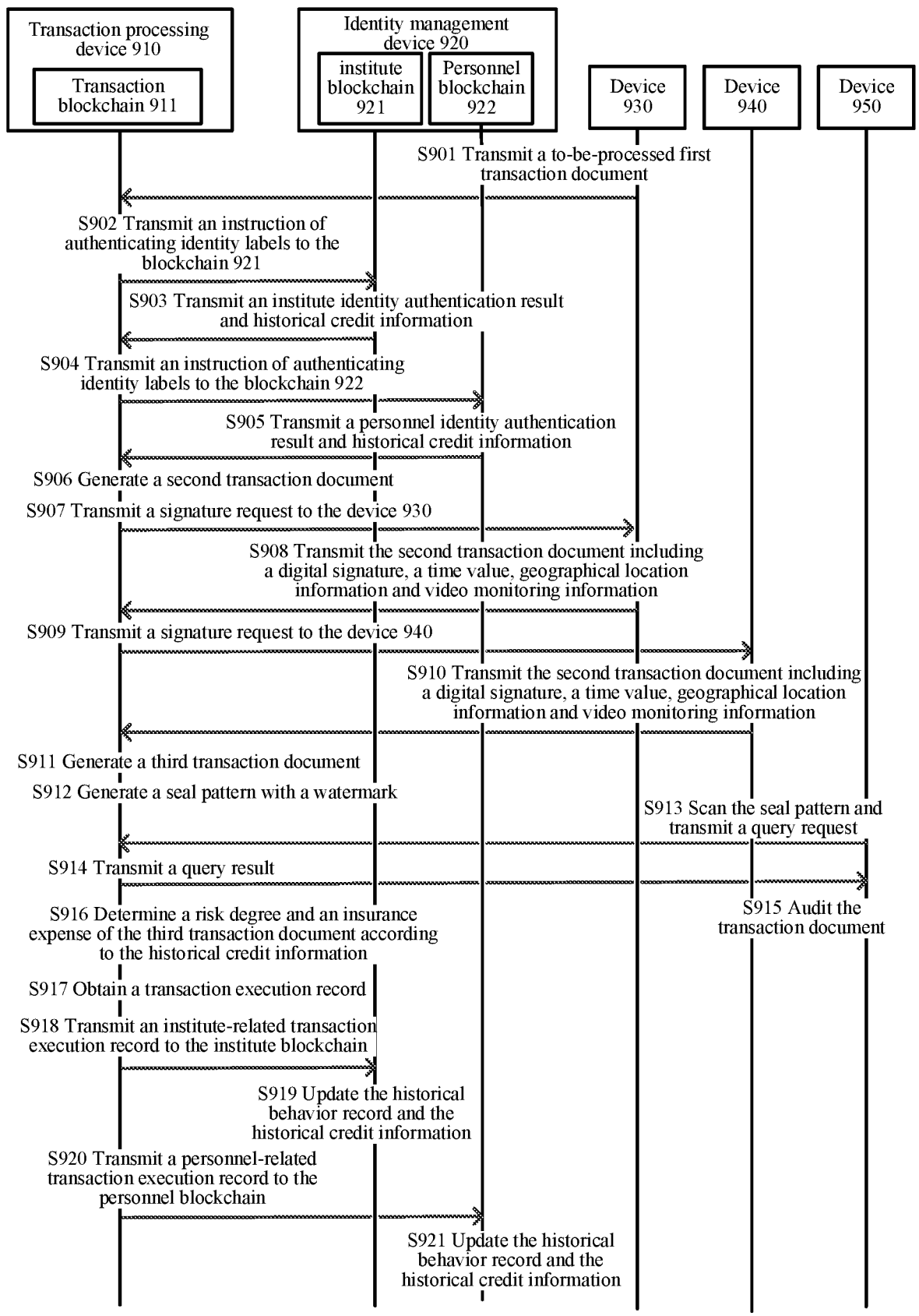
FIG. 9 is an interaction diagram of a system according to some embodiments of the present disclosure.

To describe the transaction data processing flow of the present disclosure more vividly, exemplary explanations are further made below with reference to FIG. 9. FIG. 9 is an interaction diagram of a system according to some embodiments of the present disclosure. As shown in FIG. 9, the system includes a transaction processing device 910, an identity management device 920, a device 930 of a transaction participating institute, a device 940 of transaction participating personnel, and a transaction audit device 950. The transaction processing device 910 includes a transaction blockchain 911. The identity management device 920 includes an institute blockchain 921 and a personnel blockchain 922. The transaction audit device 950 may include an audit blockchain (not shown in FIG. 9).

As shown in FIG. 9, operation S901 of transmitting a to-be-processed first transaction document to the transaction processing device 910 is performed in the device 930 of the transaction participating institute. The first transaction document is, for example, a to-be-signed electronic contract. In this way, the transaction processing device 910 may receive the first transaction document.

Operation S902 of instructing the blockchain 921 to perform identity authentication on an identity label of the institute is performed in the transaction processing device 910. Operation S903 of determining an institute identity authentication result and historical credit information and transmitting the institute identity authentication result and the historical credit information to the transaction processing device 910 is performed in the blockchain 921. The transaction processing device 910 further performs operation S904 of instructing the personnel blockchain 922 to perform identity authentication on identity labels corresponding to the personnel. In this way, the personnel blockchain 922 may perform operation S905 of transmitting a personnel identity authentication result and historical credit information to the transaction processing device 910. The transaction processing device 910 may perform operation S902 and operation S904 concurrently or sequentially. A sequence of performing the two operations is not limited in the present disclosure. In a case of determining that both the institute and the personnel pass identity authentication, the transaction processing device 910 may perform operation S906 of generating a second transaction document including the identity authentication result and the historical credit information.

The transaction processing device 910 may perform operation S907 and operation S909. In operation S907, a signature request is transmitted to the device 930 of the transaction participating institute, so that the device 930 of the transaction participating institute performs a digital signature on the second transaction document. In operation S909, a signature request is transmitted to the device 940 of the transaction participating personnel, so that the device 940 of the transaction participating personnel performs a digital signature on the second transaction document. In addition, the device 930 of the transaction participating institute and the device 940 of the transaction participating personnel may obtain monitoring information, time values and geographical location information corresponding to respective digital signature procedures. In this way, operation S908 of transmitting the second transaction document including the digital signature, the monitoring information, the time value and the geographical location information to the transaction processing device 910 may be performed by the device 930 of the transaction participating institute. Similarly, operation S910 of transmitting the second transaction document including the digital signature, the monitoring information, the time value and the geographical location information to the transaction processing device 910 may be performed by the device 940 of the transaction participating personnel.

Based on the digital signatures obtained from the device 930 of the transaction participating institute and the device 940 of the transaction participating personnel, the transaction processing device 910 may perform operation S911 of generating a third transaction document. The third transaction document includes the second transaction document, the digital signature of the device 930 of the transaction participating institute, and the digital signature of the device 940 of the transaction participating personnel. In addition, the transaction processing device 910 may further perform operation S912 of generating a seal pattern with a watermark. In operation S912, a digital summary corresponding to the third transaction document and the monitoring information is generated, then a signature is performed on the digital summary through a private key of the transaction blockchain 911, to obtain a digital signature A, and a fourth transaction document including the digital signature A is generated. In addition, in operation S912, a seal pattern corresponding to the digital signature A, and a digital watermark embedded into the seal pattern may be further generated. Information of the digital watermark includes, for example, a time value and geographical location information corresponding to the device 930 of the transaction participating institute and a time value and geographical location information corresponding to the device 940 of the transaction participating personnel. Herein, the seal pattern may be displayed in the fourth transaction document. In a case that the transaction audit device 950 performs transaction audit, operation S913 of scanning the seal pattern and transmitting a query request may be performed, so that the transaction processing device 910 queries corresponding transaction document information in response to the query request. The transaction processing device 910 may further perform operation S914 of transmitting a query result to the transaction audit device 950. The transaction audit device 950 may perform operation S915 of auditing the transaction document. Herein, for a procedure of auditing the transaction document in operation S915, refer to the embodiments in the transaction audit method 800, and details are not described herein again.

In addition, the transaction processing device 910 may further perform operation S916 of determining a risk degree and an insurance expense of the third transaction document according to the historical credit information. The transaction processing device 910 may further perform operation S917 of obtaining transaction execution records of the transaction participants for the third transaction document. The transaction processing device 910 further performs operation S918 and operation S920. In operation S918, an institute-related transaction execution record is transmitted to the institute blockchain 921. In operation S920, a personnel-related transaction execution record is transmitted to the personnel blockchain 922. The institute blockchain 921 may perform operation S919 of updating the historical behavior record and the historical credit information according to the received transaction execution record. In this way, an institute chain is recorded and historical information of institutes cannot be altered. The personnel blockchain may perform operation S921 of updating the historical behavior record and the historical credit information according to the received transaction execution record. That is, a personnel chain storing historical information of persons from the institutes (personnel handling transactions) is also recorded and updated, ensuring that such historical information cannot be tampered with.

In some embodiments, identity authentication based on the institute chain and the block chain may further include determine credit score or credit balance according to corresponding historical information. In some embodiments, the degree of risk associated with a transaction may be evaluated based on credit scores and/or credit balances of the transaction participants.

Herein, for a more detailed implementation of the interaction system in FIG. 9, refer to the contents of the embodiments of FIG. 1 to FIG. 8, and details are not described herein again.

Figure 10:
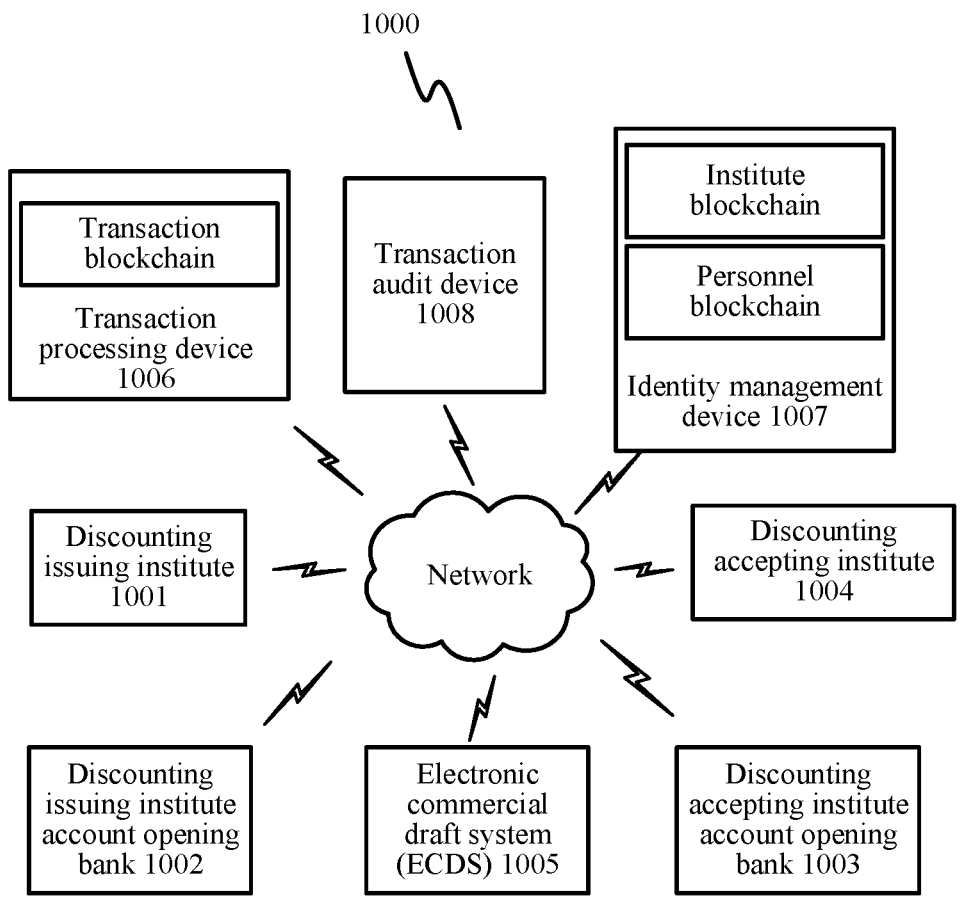
FIG. 10 is a schematic diagram of an application scenario according to the present disclosure.

FIG. 10 is a schematic diagram according to an application scenario of the present disclosure. As shown in FIG. 10, the application scenario 1000 shows a scenario of performing a discounting transaction. The application scenario 1000 includes a discounting issuing institute 1001, a discounting issuing institute account opening bank 1002 (e.g., the bank with which the discounting issuing institute opens and uses an account), a discounting accepting institute account opening bank 1003 (e.g., the bank with which the discounting accepting institute opens and uses an account), a discounting accepting institute 1004, an electronic commercial draft system (ECDS) 1005, a transaction processing device 1006 and an identity management device 1007. Herein, the discounting issuing institute 1001, the discounting issuing institute account opening bank 1002, the discounting accepting institute account opening bank 1003, and the discounting accepting institute 1004 may all be regarded as devices of transaction participants. In addition, the transaction processing device 1006 may be implemented as the transaction processing device 101 shown in FIG. 1. The identity management device 1007 may be implemented as the identity management device 103 shown in FIG. 1, but is not limited thereto.

A bank's acceptance bill is a bill that an enterprise/company (a drawer) requests, based on credit support and by depositing a security deposit in an issuing bank, an accepting bank to unconditionally pay a determined amount of money to a payee or a draft holder on a scheduled date. The draft holder may use the bill to perform a discounting transaction with a bank or a third-party institute, so as to transfer the bill. In the discounting transaction, the accepting bank (that is, 1002 and 1003) is to use a successful discounting acceptance receipt transmitted from the ECDS 1005 as an accounting treatment basis of the discounting transaction in the bank.

The discounting issuing institute 1001 may log in to a system of the discounting issuing institute account opening bank 1002 (i.e., bank at which the discounting issuing institute is an account holder), and authenticate an identity of the discounting issuing institute. In a case that the discounting issuing institute 1001 applies for a discount, a discounting rate is written by the discounting issuing institute 1001 (or may be written by the discounting issuing institute account opening bank 1002 instead), and the discounting accepting institute 1004 may accept or reject the discounting application through the discounting accepting institute account opening bank 1003. In the foregoing discounting transaction, the discounting issuing institute 1001 and the discounting issuing institute account opening bank 1002 need to sign a discounting issuing contract. The discounting accepting institute account opening bank 1003 and the discounting accepting institute 1004 need to sign a discounting accepting contract. Herein, both the discounting issuing contract and the discounting accepting contract may be regarded as electronic transaction documents. In a case that the discounting issuing contract is signed, the identity management device 1007 may perform identity authentication on the discounting issuing institute 1001 and the discounting issuing institute account opening bank 1002. The transaction processing device 1006 may generate the signed discounting issuing contract (that is, the foregoing third transaction document).

Figure 11:
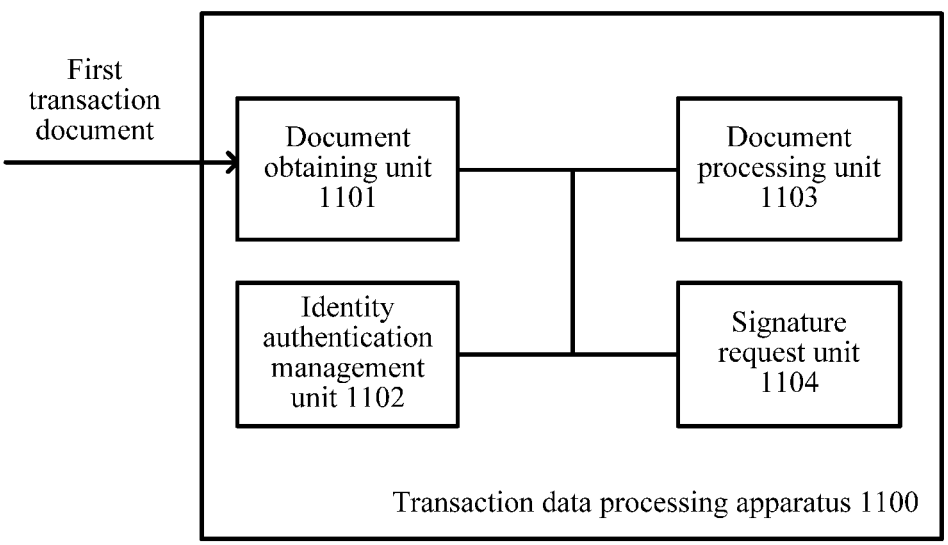
FIG. 11 is a schematic diagram of a transaction data processing apparatus 1100 according to some embodiments of the present disclosure.

FIG. 11 is a schematic diagram of a transaction data processing apparatus 1100 according to some embodiments of the present disclosure. The transaction processing device 101 may include the transaction data processing apparatus 1100. As shown in FIG. 11, the transaction data processing apparatus 1100 may include a document obtaining unit 1101, an identity authentication management unit 1102, a document processing unit 1103 and a signature request unit 1104.

The document obtaining unit 1101 is configured to receive a to-be-processed first transaction document from a device of a transaction initiator. The first transaction document is associated with identity labels of a plurality of transaction participants.

The identity authentication management unit 1102 is configured to separately perform identity authentication on the plurality of transaction participants according to the identity labels of the plurality of transaction participants, to obtain a corresponding identity authentication result. In some embodiments, the identity authentication management unit 1102 is configured to separately perform identity authentication on the plurality of transaction participants according to the following manner: instructing an identity management device (for example, 103) to perform identity authentication on the plurality of transaction participants, so that the identity management device 103 queries identity information corresponding to the identity labels of the transaction participants in a blockchain, and returns a corresponding identity authentication result. In some embodiments, the identity labels of the plurality of transaction participants include respective identity labels of a plurality of participating institutes and identity labels of participating personnel corresponding to the participating institutes. The identity management device 103 includes an institute blockchain and a personnel blockchain. The identity authentication management unit 1102 is configured to instruct the institute blockchain to perform identity authentication on the participating institutes of the plurality of transaction participants, so that the institute blockchain queries identity information corresponding to the identity labels of the participating institutes, and returns query results corresponding to the participating institutes. The identity authentication management unit 1102 is further configured to instruct the personnel blockchain to perform identity authentication on the participating personnel of the plurality of transaction participants, so that the personnel blockchain queries identity information corresponding to the identity labels of the participating personnel, and returns query results corresponding to the participating personnel.

The document processing unit 1103 is configured to add the identity authentication result into the first transaction document in a case that identity authentication of each of the plurality of transaction participants is successful, to generate a second transaction document carrying the identity authentication result.

The signature request unit 1104 is further configured to separately transmit a signature request for the second transaction document to devices of the plurality of transaction participants. The document processing unit 1103 is further configured to generate a third transaction document according to responses returned by the devices (for example, 104 and 105) of the plurality of transaction participants in response to the signature request. The third transaction document includes the second transaction document and digital signatures respectively generated by respective private keys of the plurality of transaction participants for the second transaction document.

Figure 12:
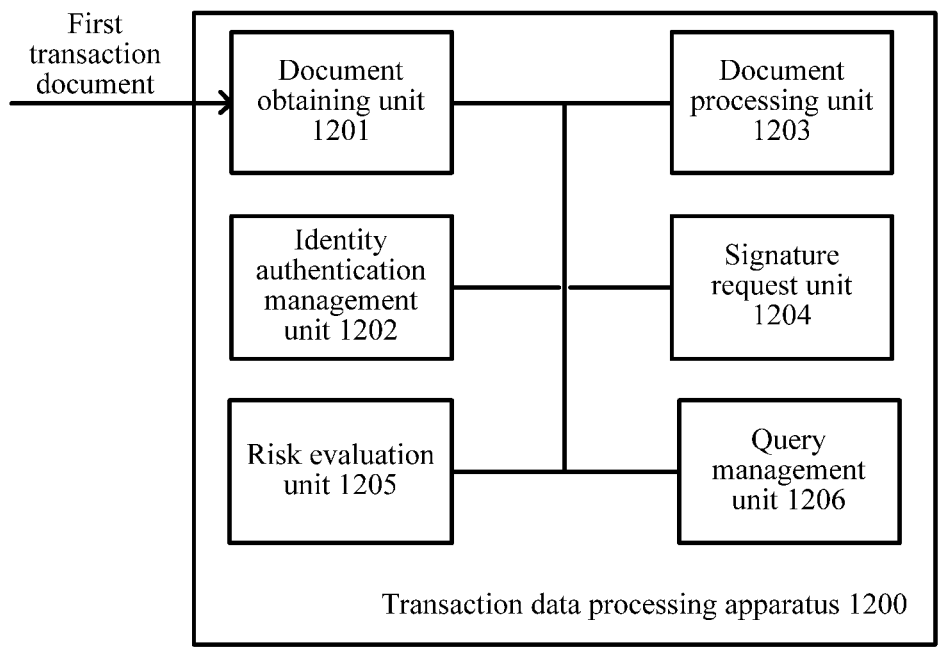
FIG. 12 is a schematic diagram of a transaction data processing apparatus 1200 according to some embodiments of the present disclosure.

FIG. 12 is a schematic diagram of a transaction data processing apparatus 1200 according to some embodiments of the present disclosure. The transaction processing device 101 may include the transaction data processing apparatus 1200. As shown in FIG. 12, the transaction data processing apparatus 1200 may include a document obtaining unit 1201, an identity authentication management unit 1202, a document processing unit 1203 and a signature request unit 1204. Herein, the document obtaining unit 1201, the identity authentication management unit 1202, the document processing unit 1203 and the signature request unit 1204 may respectively perform consistent operations performed by the document obtaining unit 1101, the identity authentication management unit 1102, the document processing unit 1103 and the signature request unit 1104. Details are not described herein again. In addition, the transaction data processing apparatus 1200 further includes a risk evaluation unit 1205 and a query management unit 1206.

In some embodiments, the identity management device 103 further obtains and returns historical credit information corresponding to the identity labels of the transaction participants in a case of querying the identity information corresponding to the identity labels of the transaction participants. The identity authentication management unit 1202 is further configured to receive the historical credit information. The document processing unit 1203 is further configured to add the historical credit information into the second transaction document in a case that identity authentication of each of the plurality of transaction participants is successful.

In some embodiments, the identity authentication management unit 1202 is further configured to obtain historical credit information corresponding to the identity labels of the transaction participants in a case of obtaining the identity authentication result corresponding to the identity labels of the transaction participants. The document processing unit 1203 is further configured to add the historical credit information into the second transaction document in a case that identity authentication of each of the plurality of transaction participants is successful.

The risk evaluation unit 1205 is configured to determine a risk degree of the third transaction document according to the respective historical credit information of the plurality of transaction participants. The risk evaluation unit 1205 is further configured to determine, according to the risk degree of the third transaction document, a resource value that needs to be provided. The risk evaluation unit 1205 is further configured to determine a transaction level of the third transaction document. The transaction level is used for representing a degree of loss caused in a case that the third transaction document is not successfully performed.

In an embodiment, in a case that the transaction level of the third transaction document is greater than a threshold, the document obtaining unit 1201 is further configured to obtain monitoring information respectively collected by the devices of the plurality of transaction participants. The monitoring information collected by the devices of the transaction participants includes video records or image records related to the procedure of returning, by the devices, the responses in response to the signature request. The document processing unit 1203 is further configured to generate abstract information corresponding to the monitoring information and the third transaction document, and perform the digital signature on the abstract information through a private key of a target information storage system. The document processing unit 1203 is further configured to generate a seal pattern related to a digital signature corresponding to the abstract information, and store the seal pattern in the target information storage system.

In an embodiment, in a case that the transaction level of the third transaction document is greater than a threshold, the document obtaining unit 1201 obtains biometric recognition information respectively corresponding to the devices of the plurality of transaction participants from the devices of the plurality of transaction participants. The biometric recognition information corresponding to the devices of the transaction participants is used for describing biometric features of users who operate the devices to return the responses in response to the signature request. The biometric recognition information includes at least one of fingerprint information, voice information and iris information. The document processing unit 1203 is further configured to generate abstract information corresponding to the biometric recognition information and the third transaction document, and perform the digital signature on the abstract information through a private key of a target information storage system. The document processing unit 1203 is further configured to generate a seal pattern related to a digital signature corresponding to the abstract information, and store the seal pattern in the target information storage system.

In an embodiment, the signature request unit 1204 is further configured to separately transmit the signature request to the devices of the transaction participants, so that the devices of the transaction participants perform a digital signature operation on the second transaction document through corresponding private keys and return the second transaction document including the corresponding digital signatures. The document obtaining unit 1201 may further receive the second transaction document including the digital signatures corresponding to the transaction participants from the devices of the transaction participants, and instruct the document processing unit 1203 to generate the third transaction document.

In an embodiment, the document obtaining unit 1201 is configured to separately transmit the signature request to the devices of the transaction participants, so that the devices of the transaction participants return corresponding signature authorization messages. The document processing unit 1203 is further configured to perform, through the private keys of the transaction participants, the digital signature on the second transaction document in response to the signature authorization messages, received by the document obtaining unit 1201, corresponding to the transaction participants, to generate the third transaction document. The document processing unit 1203 is further configured to perform the digital signature on the third transaction document through a private key of the target information storage system, to obtain a corresponding fourth transaction document, and store the fourth transaction document in the target information storage system.

In an embodiment, the document obtaining unit 1201 is further configured to obtain a time value at which the devices respond to the signature request and geographical location information from the devices of the plurality of transaction participants. The document processing unit 1203 is further configured to embed a digital watermark including the time value and the geographical location information into the seal pattern. The seal pattern is a two-dimensional barcode.

The query management unit 1206 may query and return transaction document information, corresponding to the seal pattern, in a transaction blockchain in response to a received query request related to the seal pattern.

In an embodiment, the document obtaining unit 1201 is further configured to obtain a transaction execution record of the third transaction document, and transmit the transaction execution record of the third transaction document to the identity management device 103, so that the identity management device 103 associates the identity information of the plurality of transaction participants with the transaction execution record, and determines historical credit information of corresponding transaction participants according to the transaction execution record.

Figure 13:
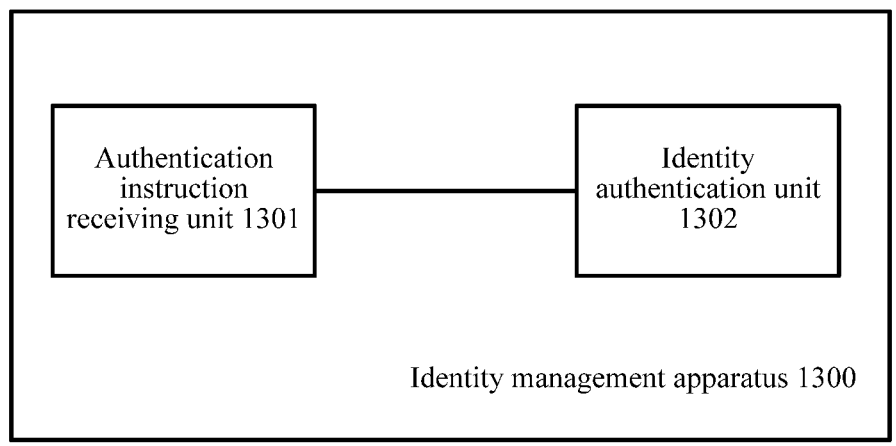
FIG. 13 is a schematic diagram of an identity management apparatus 1300 according to some embodiments of the present disclosure.

FIG. 13 is a schematic diagram of an identity management apparatus 1300 according to some embodiments of the present disclosure. The identity management device 103 may include the identity management apparatus 1300. As shown in FIG. 13, the identity management apparatus 1300 includes an authentication instruction receiving unit 1301 and an identity authentication unit 1302. The authentication instruction receiving unit 1301 is configured to receive a corresponding instruction of performing identity authentication on the plurality of transaction participants. The identity authentication unit 1302 is configured to query identity information corresponding to the plurality of transaction participants, and generate and return a corresponding identity authentication result.

Figure 14:
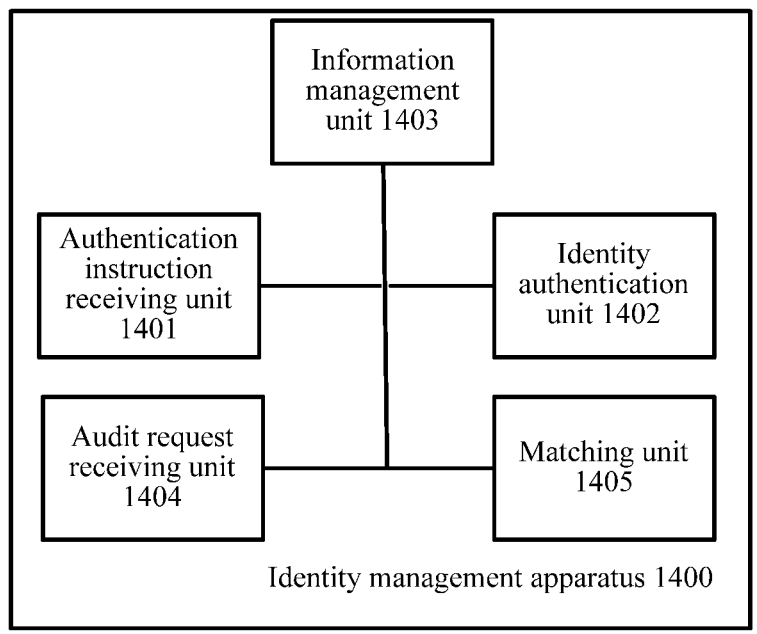
FIG. 14 is a schematic diagram of an identity management apparatus 1400 according to some embodiments of the present disclosure.

FIG. 14 is a schematic diagram of an identity management apparatus 1400 according to some embodiments of the present disclosure. The identity management device 103 may include the identity management apparatus 1400. As shown in FIG. 14, the identity management apparatus 1400 includes an authentication instruction receiving unit 1401, an identity authentication unit 1402 and an information management unit 1403. Herein, the authentication instruction receiving unit 1401 and the identity authentication unit 1402 may respectively perform consistent operations performed by the authentication instruction receiving unit 1301 and the identity authentication unit 1302. Details are not described herein again.

Before receiving the instruction, the information management unit 1403 may obtain the identity information of the plurality of transaction participants. The information management unit 1403 may further obtain historical behavior records of the transaction participants, and store the historical behavior records associatively with the corresponding identity information. The historical behavior record of each transaction participant includes at least one of a transaction document corresponding to a transaction participated in by the transaction participant and a transaction execution record of the transaction document.

The information management unit 1403 is configured to determine historical credit information of the transaction participants according to the historical behavior records of the transaction participants.

In some embodiments, the identity authentication unit 1402 is further configured to query and return historical credit information associated with the identity information. The information management unit 1403 may obtain a historical behavior record corresponding to a transaction document most recently participated in by the transaction participants, and update corresponding historical credit information.

In some embodiments, the identity management apparatus 1400 further includes an audit request receiving unit 1404 and a matching unit 1405. The audit request receiving unit 1404 is configured to receive biometric feature information, respectively corresponding to one or more transaction participants, transmitted by a transaction audit device. The biometric feature information corresponding to the transaction participants is used for describing biometric features of operators of devices of the transaction participants. The matching unit 1405 is configured to match the biometric feature information, received by the audit request receiving unit 1404, corresponding to the transaction participants with biometric feature information in the identity information of the transaction participants, and return a corresponding matching result to the transaction audit device.

Figure 15:
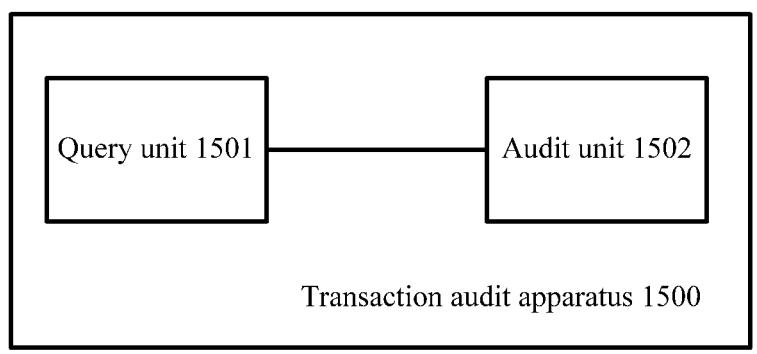
FIG. 15 is a schematic diagram of a transaction audit apparatus 1500 according to some embodiments of the present disclosure.

FIG. 15 is a schematic diagram of a transaction audit apparatus 1500 according to some embodiments of the present disclosure. The transaction audit device 106 may include the transaction audit apparatus 1500. As shown in FIG. 15, the transaction audit apparatus may include a query unit 1501 and an audit unit 1502. The query unit 1501 is configured to obtain transaction document information corresponding to a third transaction document, the transaction document information including identity labels of transaction participants participating in the third transaction document, an identity authentication result, and digital signatures of the transaction participants. In an embodiment, the query unit 1501 may transmit, according to a seal pattern corresponding to the third transaction document, a request for transaction document information corresponding to the seal pattern to a transaction processing device, so that the transaction processing device returns the corresponding transaction document information.

The audit unit 1502 is configured to determine that the third transaction document has an anomaly upon detecting an abnormal identity of at least one transaction participant according to an identity authentication result according to the identity authentication result. The audit unit 1502 is further configured to match the digital signatures of the transaction participants with the corresponding identity labels, and determine that the third transaction document has an anomaly in a case of determining that at least one digital signature of the digital signatures of the transaction participants does not match the corresponding identity labels.

Figure 16:
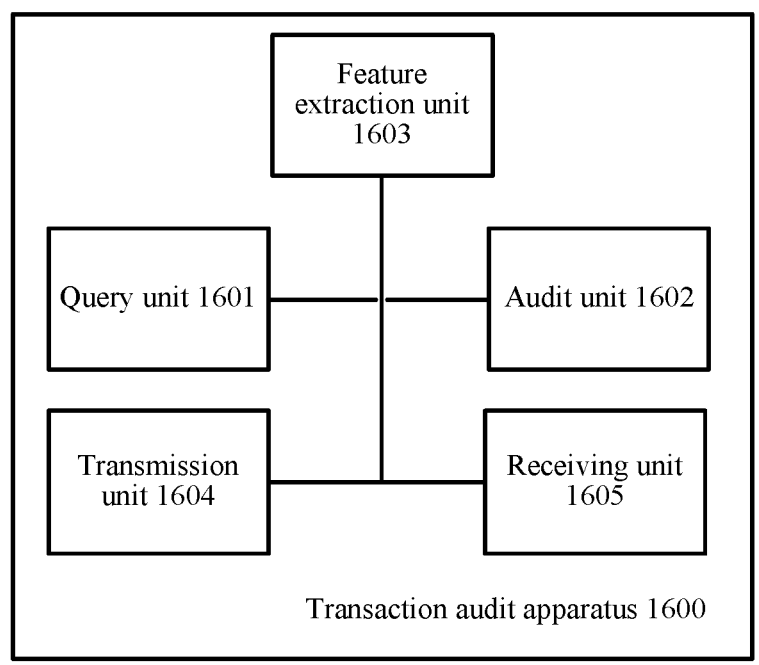
FIG. 16 is a schematic diagram of a transaction audit apparatus 1600 according to some embodiments of the present disclosure.

FIG. 16 is a schematic diagram of a transaction audit apparatus 1600 according to some embodiments of the present disclosure. The transaction audit device 106 may include the transaction audit apparatus 1600. As shown in FIG. 16, the transaction audit apparatus 1600 may include a query unit 1601 and an audit unit 1602. The query unit 1601 and the audit unit 1602 may respectively perform consistent operations performed by the query unit 1501 and the audit unit 1502. Details are not described herein again.

In some embodiments, the transaction document information further includes monitoring information corresponding to the third transaction document, and the monitoring information includes video records or image records that are respectively collected by devices of a plurality of transaction participants participating in the third transaction document and that are related to operators of the devices. The transaction audit apparatus 1600 further includes a feature extraction unit 1603, configured to extract facial feature information respectively corresponding to the plurality of transaction participants from the monitoring information. The apparatus further includes a transmission unit 1604, configured to transmit the facial feature information respectively corresponding to the plurality of transaction participants to an identity management apparatus, so that the identity management apparatus (for example, 1400) matches the facial feature information corresponding to the transaction participants with locally stored corresponding information, and returns corresponding matching results. The transaction audit apparatus 1600 further includes a receiving unit 1605, configured to receive the matching results respectively corresponding to the plurality of transaction participants. The audit unit 1602 determines that the third transaction document has an anomaly in a case that the facial feature information respectively corresponding to the plurality of transaction participants does not totally match successfully.

In some embodiments, the transaction document information further includes biometric recognition information respectively corresponding to the plurality of transaction participants participating in the third transaction document. The biometric recognition information corresponding to the transaction participants is used for describing biometric features related to operators of devices of the transaction participants. The biometric recognition information includes at least one of fingerprint information, voice information and iris information. The transmission unit 1604 is configured to transmit the biometric recognition information respectively corresponding to the plurality of transaction participants to the identity management apparatus 1400, so that the identity management apparatus 1400 matches the biometric recognition information corresponding to the transaction participants with locally stored corresponding information, and returns matching results. The receiving unit 1605 is configured to receive the matching results respectively corresponding to the plurality of transaction participants. The audit unit 1602 determines that the third transaction document has an anomaly in a case that the biometric recognition information respectively corresponding to at least one of the plurality of transaction participants does not totally match successfully.

Figure 17:
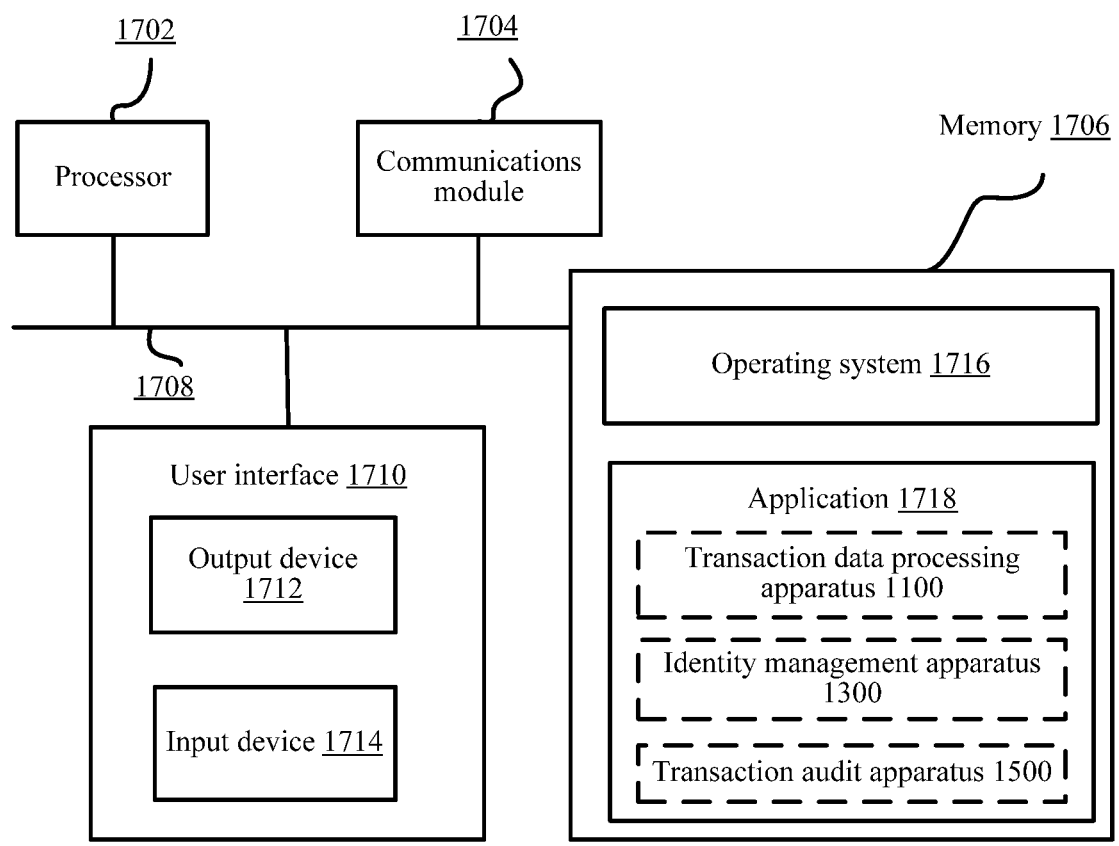
FIG. 17 is a structural diagram of a device according to some embodiments of the present disclosure.

FIG. 17 is a structural diagram of composition of a computing device in which the foregoing entities are located. Herein, the computing device may be implemented as the transaction processing device 101, the transaction processing device 102, the identity management device 103, the device 104 of the transaction participants, the device 105 of the transaction participants, or the transaction audit device 106 in FIG. 1. As shown in FIG. 17, the computing device includes one or more processors (CPU) 1702, a communications module 1704, a memory 1706, a user interface 1710, and a communications bus 1708 for interconnecting these components. The processor 1702 may receive and transmit data by using the communications module 1704 to implement network communication and/or local communication.

The user interface 1710 includes one or more output devices 1712, including one or more speakers and/or one or more visualization displays. The user interface 1710 further includes one or more input devices 1714, including a keyboard, a mouse, a sound command input unit or a microphone, a touch display, a touch-sensitive input panel, a posture capturing camera, another input key or control, or the like.

The memory 1706 may be a high-speed random access memory such as a DRAM, an SRAM, a DDR RAM, or other random access solid-state memory devices; or a non-volatile memory such as one or more magnetic disk storage devices, optical disc storage devices, flash memory devices, or other non-volatile solid-state memory devices. The memory 1706 stores an instruction set that can be executed by the processor 1702 and includes an operating system 1716 and an application 1718. The operating system 1716 includes a program used for processing various basic system services and for executing hardware-related tasks. The application 1718 includes various programs for implementing the foregoing media data processing method, where the programs may implement the processing procedure in each embodiment, and may include, for example, the transaction data processing apparatus 1100 shown in FIG. 11, the transaction data processing apparatus 1200 shown in FIG. 12, the identity management apparatus 1300 shown in FIG. 13, the identity management apparatus 1400 shown in FIG. 14, the transaction audit apparatus 1500 or the transaction audit apparatus 1600.

In addition, each embodiment of the present disclosure may be implemented by a data processing program executed by a data processing device such as a computer. Apparently, the data processing program constitutes the present disclosure. In addition, generally, a data processing program stored in a storage medium is directly read from the storage medium for execution or the program is installed on or replicated to a storage device (such as a hard disk or memory) of a data processing device for execution. Therefore, such a storage medium also constitutes the present disclosure. The storage medium may use any type of recording manner, for example, a paper storage medium (such as paper tape), a magnetic storage medium (such as a floppy disk, a hard disk, and a flash memory), an optical storage medium (such as CD-ROM), and a magneto-optical storage medium (such as MO). Therefore, the present disclosure further provides a non-volatile storage medium, which stores a data processing program. The data processing program is used for executing any embodiment of the foregoing method of the present disclosure.

In addition, the operations of the method of the present disclosure may be implemented not only by the data processing program, but also by hardware, such as a logic gate, a switch, an Application-Specific Integrated Circuit (ASIC), a programmable logic controller, and an embedded microcontroller. Therefore, the hardware that may implement the method of the present disclosure may also constitute the present disclosure.

The foregoing descriptions are merely exemplary implementations of the present disclosure, but are not intended to limit the present disclosure. Any modification, equivalent replacement, or improvement made without departing from the spirit and principle of the present disclosure is to fall within the protection scope of the present disclosure.

What is claimed is:

1. A transaction data processing method, performed by a transaction processing device, and comprising:
receiving a first transaction document from a device of a transaction initiator, the first transaction document being associated with identity labels of a plurality of transaction participants, and the identity labels including identity labels for participating institutes and identity labels for participating persons;
performing identity authentication on the plurality of transaction participants according to the identity labels of the plurality of transaction participants, to obtain an identity authentication result, the identity authentication result including institute authentication results and personnel authentication results, wherein performing identity authentication comprises:
sending an identity authentication request to an identity management device, wherein the identity management device performs a query on a whitelist or a blacklist, the whitelist recording participants allowed to participate in a transaction, and the blacklist recording participants not registered or forbidden to participate in the transaction; and
receiving a reply from the identity management device according to the query as performed;
adding the identity authentication result into the first transaction document when the identity authentication result indicates identity authentication of each of the plurality of transaction participants is successful, to generate a second transaction document carrying the identity authentication result;
transmitting a signature request for the second transaction document to devices of the plurality of transaction participants;
generating a third transaction document according to responses returned by the devices of the plurality of transaction participants in response to the signature request, the third transaction document including the second transaction document and digital signatures generated by private keys of the plurality of transaction participants for the second transaction document;
generating a seal pattern with a water mark;
adding the seal pattern to the third transaction document to obtain a fourth transaction document;
sending the fourth transaction document to a transaction audit device, wherein the transaction audit device performs a query on the seal pattern to obtain a query result; and receiving query result from the transaction audit device.

2. The transaction data processing method according to claim 1, wherein performing identity authentication on the plurality of transaction participants comprises:
transmitting an instruction of performing identity authentication on the participating institutes to an identity management device; or
transmitting an instruction of performing identity authentication on the participating persons to the identity management device.

3. The transaction data processing method according to claim 2, further comprising:
receiving historical credit information corresponding to the identity labels of the transaction participants from the identity management device; and
adding the historical credit information into the second transaction document.

4. The transaction data processing method according to claim 1, further comprising:
obtaining historical credit information corresponding to the identity labels of the transaction participants; and
adding the historical credit information into the second transaction document.

5. The transaction data processing method according to claim 1, wherein generating the third transaction document comprises:
transmitting the signature request to the devices of the transaction participants; and receiving second transaction documents, each including one digital signature corresponding to one of the transaction participants, from the devices of the transaction participants, and generating the third transaction document.

6. The transaction data processing method according to claim 1, wherein generating the third transaction document comprises:
transmitting the signature request to the devices of the transaction participants; and
generating the third transaction document by using the private keys of the transaction participants.

7. The transaction data processing method according to claim 1, further comprising:
determining a transaction level of the third transaction document;
obtaining monitoring information collected by the devices of the plurality of transaction participants;
generating abstract information corresponding to the monitoring information and the third transaction document; and
generating a seal pattern corresponding to the abstract information.

8. The transaction data processing method according to claim 1, further comprising:
determining a transaction level of the third transaction document;
obtaining biometric recognition information collected by the devices of the plurality of transaction participants;
generating abstract information corresponding to the biometric recognition information and the third transaction document; and
generating a seal pattern corresponding to the abstract information, and storing the seal pattern in the target information storage system.

9. The transaction data processing method according to claim 3, further comprising:
obtaining a transaction execution record of the third transaction document; and
transmitting the transaction execution record of the third transaction document to the identity management device.

10. A computing device, comprising a processor and a memory coupled to the processor, the processor being configured to perform:
receiving a first transaction document from a device of a transaction initiator, the first transaction document being associated with identity labels of a plurality of transaction participants, and the identity labels including identity labels for participating institutes and identity labels for participating persons;
performing identity authentication on the plurality of transaction participants according to the identity labels of the plurality of transaction participants, to obtain an identity authentication result, the identity authentication result including institute authentication results and personnel authentication results, wherein performing identity authentication comprises:
sending an identity authentication request to an identity management device, wherein the identity management device performs a query on a whitelist or a blacklist, the whitelist recording participants allowed to participate in a transaction, and the blacklist recording participants not registered or forbidden to participate in the transaction; and
receiving a reply from the identity management device according to the query as performed;
adding the identity authentication result into the first transaction document when the identity authentication result indicates identity authentication of each of the plurality of transaction participants is successful, to generate a second transaction document carrying the identity authentication result;
transmitting a signature request for the second transaction document to devices of the plurality of transaction participants;
generating a third transaction document according to responses returned by the devices of the plurality of transaction participants in response to the signature request, the third transaction document including the second transaction document and digital signatures generated by private keys of the plurality of transaction participants for the second transaction document;
generating a seal pattern with a water mark;
adding the seal pattern to the third transaction document to obtain a fourth transaction document;
sending the fourth transaction document to a transaction audit device, wherein the transaction audit device performs a query on the seal pattern to obtain a query result; and
receiving query result from the transaction audit device.

11. The computing device according to claim 10, wherein the performing identity authentication on the plurality of transaction participants includes:
transmitting an instruction of performing identity authentication on the participating institutes to an identity management device; or
transmitting an instruction of performing identity authentication on the participating persons to the identity management device.

12. The computing device according to claim 11, wherein the processor is further configured to perform:
receiving historical credit information corresponding to the identity labels of the transaction participants from the identity management device; and
adding the historical credit information into the second transaction document.

13. The computing device according to claim 10, wherein the processor is further configured to perform:
obtaining historical credit information corresponding to the identity labels of the transaction participants; and
adding the historical credit information into the second transaction document.

14. The computing device according to claim 10, wherein the generating a third transaction document according to responses returned by the devices of the plurality of transaction participants in response to the signature request includes:
transmitting the signature request to the devices of the transaction participants; and
receiving second transaction documents, each including one digital signature corresponding to one of the transaction participants, from the devices of the transaction participants, and generating the third transaction document.

15. The computing device according to claim 10, wherein generating the third transaction document includes:
transmitting the signature request to the devices of the transaction participants; and
generating the third transaction document by using the private keys of the transaction participants.

16. The computing device according to claim 10, wherein the processor is further configured to perform:

determining a transaction level of the third transaction document;

obtaining monitoring information respectively collected by the devices of the plurality of transaction participants;

generating abstract information corresponding to the monitoring information and the third transaction document; and generating a seal pattern corresponding to the abstract information.

17. A non-transitory storage medium, storing a computer program, the computer program, when being executed by a computing device, causing the computing device to perform:

receiving a first transaction document from a device of a transaction initiator, the first transaction document being associated with identity labels of a plurality of transaction participants, and the identity labels including identity labels for participating institutes and identity labels for participating persons;

performing identity authentication on the plurality of transaction participants according to the identity labels of the plurality of transaction participants, to obtain an identity authentication result, the identity authentication result including institute authentication results and personnel authentication results, wherein performing identity authentication comprises:

sending an identity authentication request to an identity management device, wherein the identity management device performs a query on a whitelist or a blacklist, the whitelist recording participants allowed to participate in a transaction, and the blacklist recording participants not registered or forbidden to participate in the transaction; and receiving a reply from the identity management device according to the query as performed;

adding the identity authentication result into the first transaction document when the identity authentication result indicates identity authentication of each of the plurality of transaction participants is successful, to generate a second transaction document carrying the identity authentication result;

transmitting a signature request for the second transaction document to devices of the plurality of transaction participants;

generating a third transaction document according to responses returned by the devices of the plurality of transaction participants in response to the signature request, the third transaction document including the second transaction document and digital signatures generated by private keys of the plurality of transaction participants for the second transaction document;

generating a seal pattern with a water mark;

adding the seal pattern to the third transaction document to obtain a fourth transaction document;

sending the fourth transaction document to a transaction audit device, wherein the transaction audit device performs a query on the seal pattern to obtain a query result; and receiving query result from the transaction audit device.

18. The non-transitory storage medium according to claim 17, wherein performing identity authentication on the plurality of transaction participants comprises:

transmitting an instruction of performing identity authentication on the participating institutes to an identity management device; or transmitting an instruction of performing identity authentication on the participating persons to the identity management device.

19. The transaction data processing method according to claim 1, further comprising:

obtaining credit scores or credit balances of the plurality of transaction participants;

assessing a degree of risk of the third transaction document according to the credit scores or the credit balances.

* * * * *